(12) United States Patent
Cho et al.

(10) Patent No.: US 12,498,766 B2
(45) Date of Patent: Dec. 16, 2025

(54) HINGE ASSEMBLY AND ELECTRONIC DEVICE INCLUDING THE SAME

(71) Applicant: SAMSUNG ELECTRONICS CO., LTD., Suwon-si (KR)

(72) Inventors: Chongkun Cho, Suwon-si (KR); Donghyun Byun, Suwon-si (KR); Chungkeun Yoo, Suwon-si (KR); Sukjin Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 18/076,617

(22) Filed: Dec. 7, 2022

(65) Prior Publication Data

US 2023/0176629 A1     Jun. 8, 2023

Related U.S. Application Data

(63) Continuation of application No. PCT/KR2022/015461, filed on Oct. 13, 2022.

(30) Foreign Application Priority Data

Dec. 8, 2021   (KR) .................. 10-2021-0174725
Dec. 28, 2021  (KR) .................. 10-2021-0189770

(51) Int. Cl.
*G06F 1/16*   (2006.01)
*H04M 1/02*   (2006.01)

(52) U.S. Cl.
CPC .......... *G06F 1/1681* (2013.01); *G06F 1/1652* (2013.01); *H04M 1/0216* (2013.01); *H04M 1/0268* (2013.01)

(58) Field of Classification Search
CPC ........ G06F 1/1681; G06F 1/1652; G06F 1/16; G06F 1/1641; H04M 1/021; H04M 1/0268; H04M 1/022; F16C 11/04

See application file for complete search history.

(56) References Cited

U.S. PATENT DOCUMENTS 10,037,058 B2   7/2018  Kato
10,845,850 B1   11/2020 Kang et al.
(Continued)

FOREIGN PATENT DOCUMENTS

EP        3 734 946        8/2021
KR    10-2020-0101251      8/2020
(Continued)

OTHER PUBLICATIONS

Examination Report dated Nov. 4, 2025 in Indian Patent Application No. 202447039599 and English-language translation.

*Primary Examiner* — Allen L Parker
*Assistant Examiner* — Keon Kim
(74) *Attorney, Agent, or Firm* — Nixon & Vanderhye, P.C.

(57) ABSTRACT

An electronic device may include a display, a first housing, a second housing, and a hinge assembly configured to connect the first housing to the second housing and operate between a folded state and an unfolded state, wherein the hinge assembly may include a hinge bracket, a slider slidably connected to the hinge bracket and including a pair of reference cams and a pair of rotation rails configured to define a pair of hinge axes, a pair of rotators rotatably connected to the slider with the pair of hinge axes as centers, respectively, and both including a rotation cam configured to interoperate with the reference cams, and an elastic member configured to provide an elastic force in a direction in which the reference cam and the rotation cam press each other.

19 Claims, 23 Drawing Sheets

(56) References Cited

U.S. PATENT DOCUMENTS

| | | | |
|---|---|---|---|
| 2021/0120687 A1 | 4/2021 | Kim et al. | |
| 2021/0263565 A1* | 8/2021 | Yen | G06F 1/1681 |
| 2021/0271294 A1* | 9/2021 | Liao | G06F 1/181 |
| 2021/0274028 A1* | 9/2021 | Park | H04M 1/0216 |
| 2021/0365073 A1* | 11/2021 | Cha | G06F 1/1652 |
| 2023/0143520 A1* | 5/2023 | Park | G06F 1/16 455/566 |

FOREIGN PATENT DOCUMENTS

| | | |
|---|---|---|
| WO | 2020/186889 | 9/2020 |
| WO | 2021/025441 | 2/2021 |

\* cited by examiner

HINGE ASSEMBLY AND ELECTRONIC DEVICE INCLUDING THE SAME

CROSS-REFERENCE TO RELATED APPLICATIONS

This application is a continuation application of International Application No. PCT/KR2022/015461 designating the United States, filed on Oct. 13, 2022, in the Korean Intellectual Property Receiving Office and claiming priority to Korean Patent Application No. 10-2021-0174725, filed on Dec. 8, 2021, in the Korean Intellectual Property Office, and Korean Patent Application No. 10-2021-0189770, filed on Dec. 28, 2021, in the Korean Intellectual Property Office, the disclosures of which are incorporated by reference herein in their entireties.

BACKGROUND

1. Field

The disclosure relates to a hinge assembly and an electronic device including the hinge assembly.

2. Description of Related Art

With the development of display-related technologies, electronic devices with flexible displays have been developed. A flexible display may be used in the form of a flat surface, and may also be deformed to be used in a specific shape. For example, an electronic device with a flexible display may be implemented in a foldable form to be folded or unfolded about at least one folding axis.

SUMMARY

To implement a folding operation or unfolding operation of an electronic device, a hinge assembly may be provided between a first housing and a second housing. The hinge assembly may have a structure for generating a force to maintain a predetermined folding state of the electronic device. For example, the structure described above may be implemented using a cam structure and an elastic member. However, as the thickness of the electronic device decreases, the diameter of the elastic member may also decrease and this may cause a decrease in a driving force of the hinge assembly. In addition, when a rotation axis of the hinge assembly is different from an operating axis of the cam structure, driving force loss may occur in a process of transmitting rotation power to the cam structure.

According to various embodiments, a hinge assembly with a relatively small size and a relatively small number of components and an electronic device including the hinge assembly may be provided.

According to various embodiments, a hinge assembly with a large driving force while having a relatively small size and an electronic device including the hinge assembly may be provided.

According to various embodiments, an electronic device may include a display including a first area, a second area, and a folding area between the first area and the second area, a first housing configured to support the first area, a second housing configured to support the second area, and a hinge assembly configured to connect the first housing to the second housing and operate between a folded state in which the first area and the second area face each other and an unfolded state in which the first area and the second area do not face each other, wherein the hinge assembly may include a hinge bracket, a slider slidably connected to the hinge bracket and including a pair of reference cams and a pair of rotation rails configured to define a pair of hinge axes, a pair of rotators rotatably connected to the slider with the pair of hinge axes as centers, respectively, and both including a rotation cam configured to interoperate with the reference cams, and an elastic member configured to provide an elastic force in a direction in which the reference cam and the rotation cam press each other.

According to various embodiments, a hinge assembly applied to a foldable electronic device, a hinge bracket, a slider slidably connected to the hinge bracket and including a pair of reference cams and a pair of rotation rails configured to define a pair of hinge axes, a pair of rotators rotatably connected to the slider with the pair of hinge axes as centers, respectively, and both including a rotation cam configured to interoperate with the reference cams, and an elastic member configured to provide an elastic force in a direction in which the reference cam and the rotation cam press each other.

According to various embodiments, an electronic device may include a display including a first area, a second area, and a folding area between the first area and the second area, a first housing configured to support the first area, a second housing configured to support the second area, and a hinge assembly configured to connect the first housing to the second housing and operate between a folded state in which the first area and the second area face each other and an unfolded state in which the first area and the second area do not face each other, wherein the hinge assembly may include a hinge bracket, a slider slidably connected to the hinge bracket and including a pair of reference cams and a pair of rotation rails configured to define a pair of hinge axes, a pair of rotators rotatably connected to the slider with the pair of hinge axes as centers, respectively, and both including a rotation cam configured to interoperate with the reference cams, and an elastic member configured to provide an elastic force in a direction in which the reference cam and the rotation cam press each other, wherein the slider may further include a pair of main bodies in which each of the rotation rails and each of the reference cam are provided, a bridge body connecting the pair of main bodies to each other, and an elastic member support pin protruding from the main body and configured to support one side of the elastic member as the one side of the elastic member is inserted into the elastic member support pin, wherein the hinge bracket may include a pair of sliding rails provided in a direction parallel with the hinge axis, the slider may further include a pair of sliding protrusions slidably connected to the pair of sliding rails along the pair of sliding rails, respectively, and the rotation cam is formed in an arc shape with the hinge axis as a center.

According to various embodiments, a hinge assembly may have a relatively small number of components and a relatively small size.

According to various embodiments, a hinge assembly may have a large driving force while having a relatively small size.

According to various embodiments, a hinge assembly may prevent or reduce driving force loss in a process of transmitting rotation power between components.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
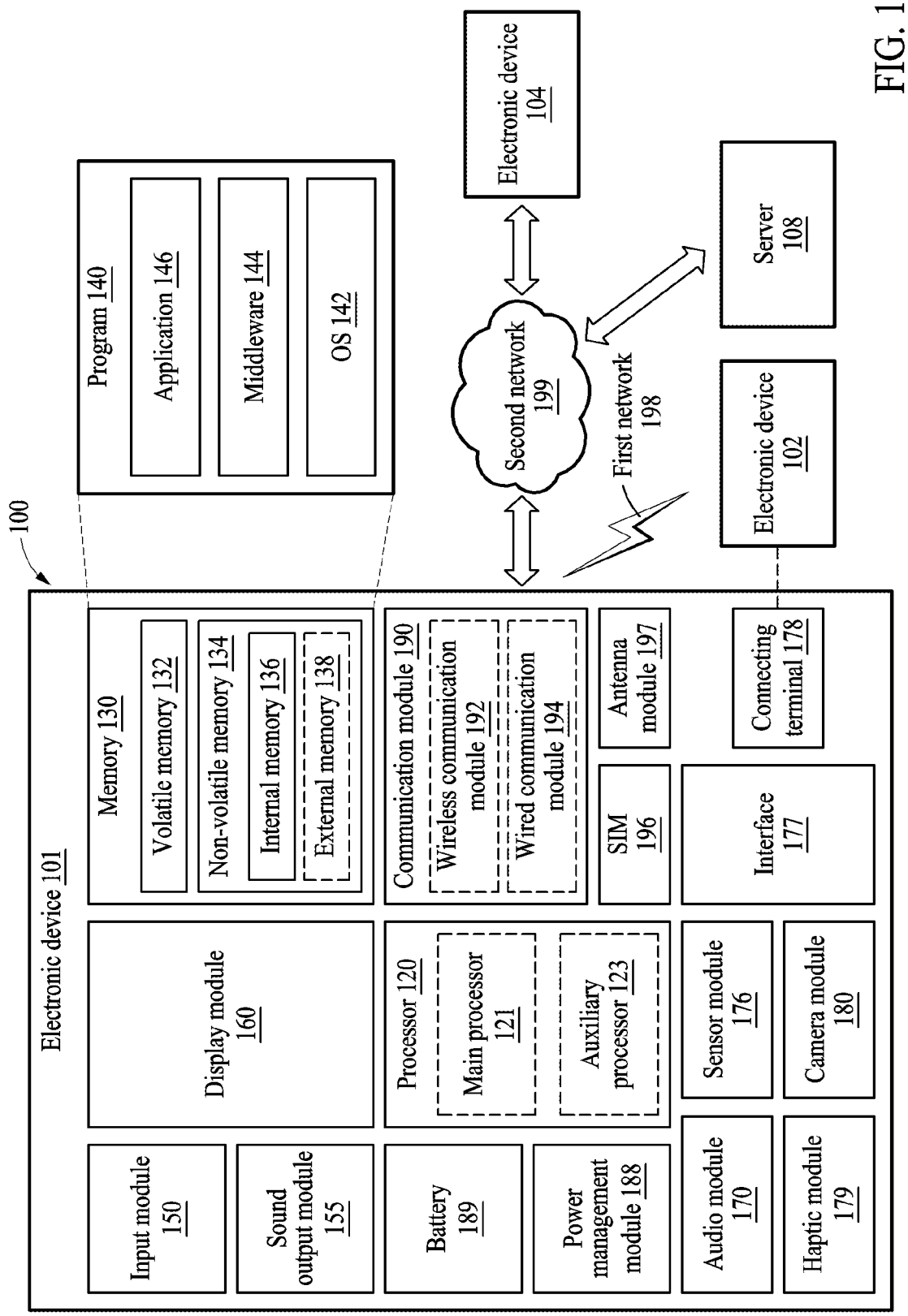
FIG. 1 is a block diagram illustrating an example electronic device in a network environment according to various embodiments.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various embodiments.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display device 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input device 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
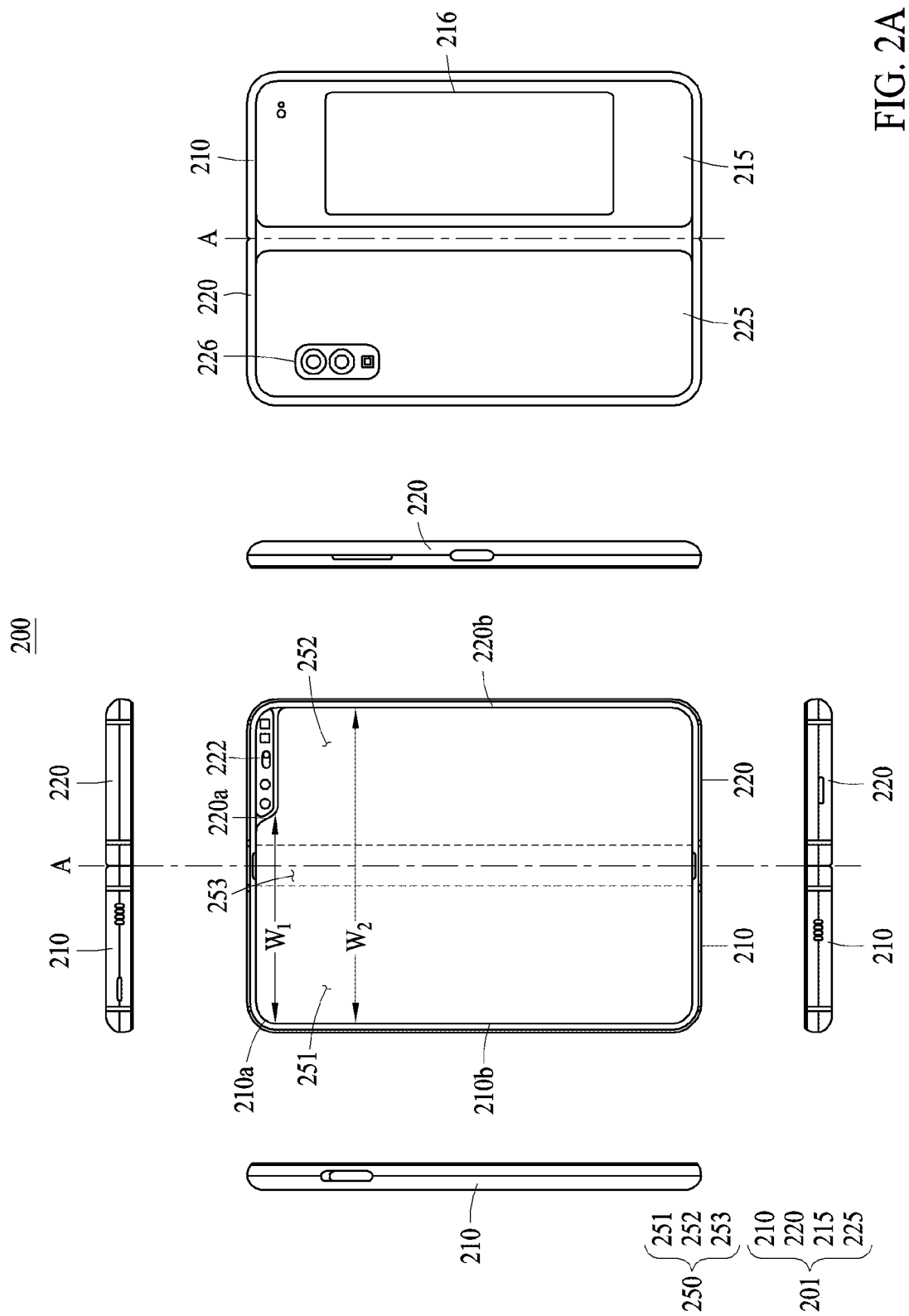
FIG. 2A is a diagram illustrating an unfolded state of an example electronic device according to various embodiments.
Figure 2B:
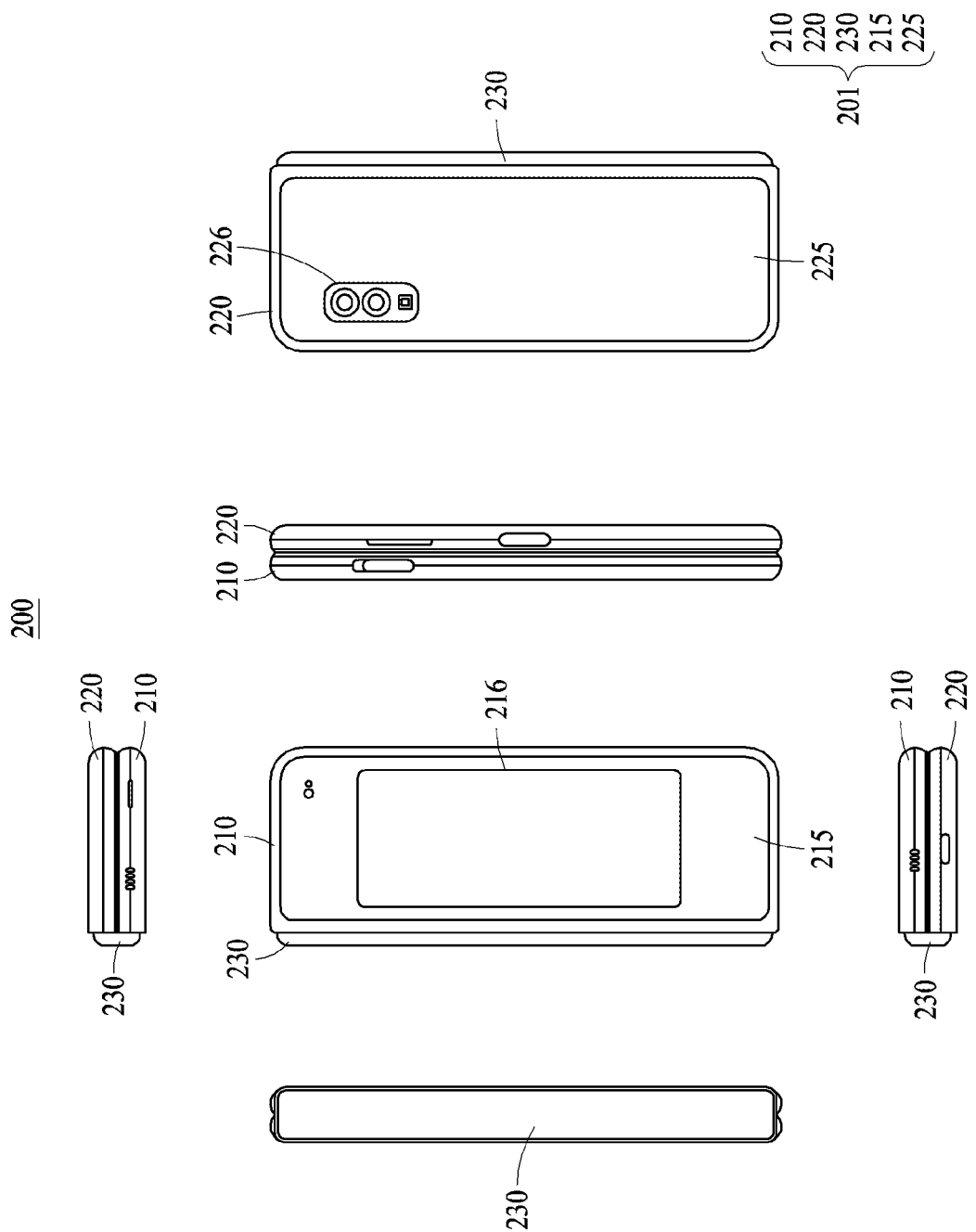
FIG. 2B is a diagram illustrating a folded state of an example electronic device according to various embodiments.
Figure 2C:
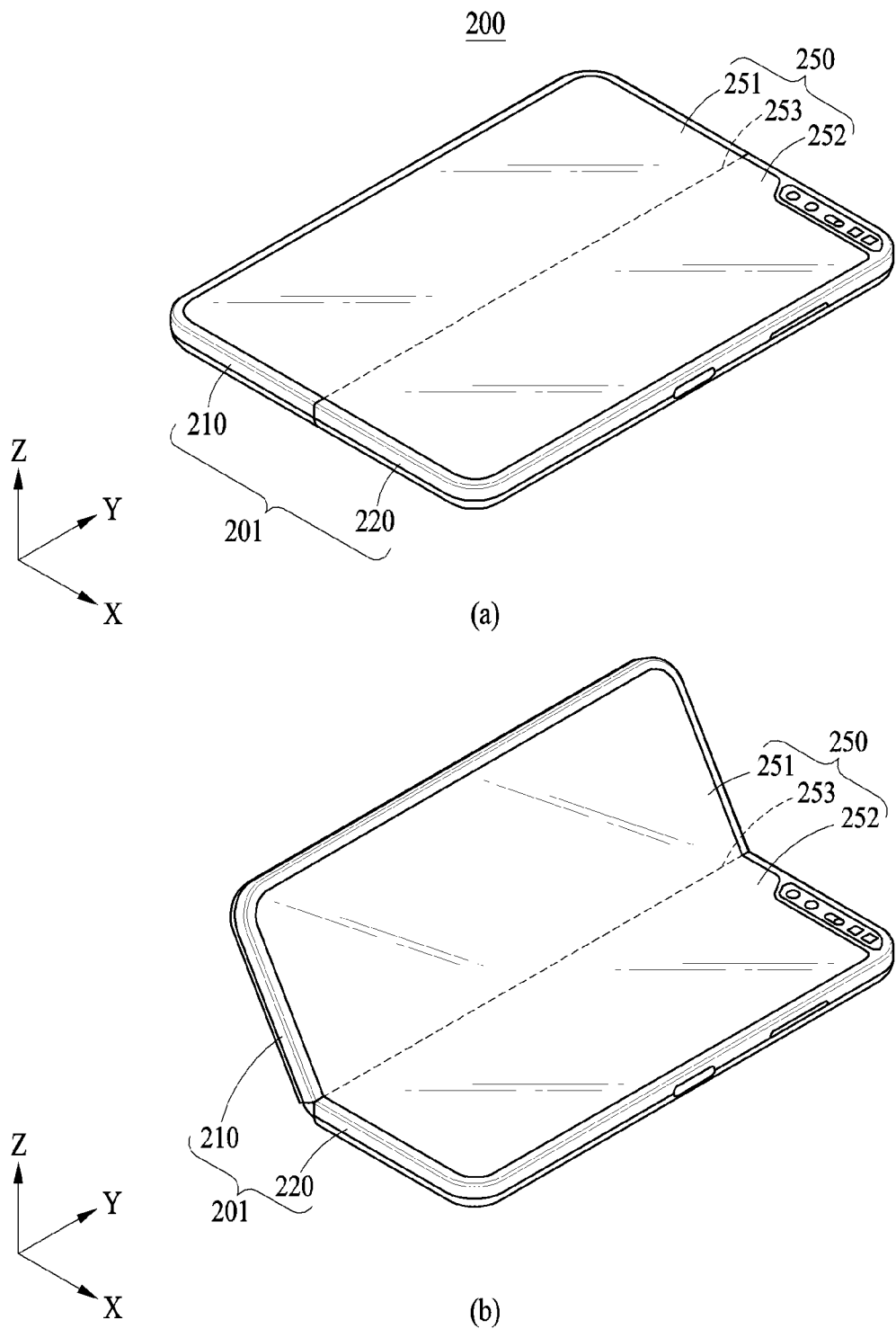
FIG. 2C is a perspective view illustrating an example of a fully unfolded state or a partially unfolded intermediate state of an example electronic device according to various embodiments.

FIG. 2A is a diagram illustrating an unfolded state of an example electronic device 200 according to various embodiments. FIG. 2B is a diagram illustrating a folded state of an example electronic device 200 according to various embodiments. FIG. 2C is a perspective view illustrating an example of a fully unfolded state or a partially unfolded intermediate state of an example electronic device according to various embodiments.

The electronic device 200 of FIGS. 2A, 2B, and 2C is an example of the electronic device 101 of FIG. 1 and may be a foldable or bendable electronic device.

In FIG. 2C and other following drawings, illustrated is a spatial coordinate system defined by an X axis, a Y axis, and a Z axis that are orthogonal to each other. Here, the X-axis may represent a width direction of an electronic device, the Y-axis may represent a length direction of the electronic device, and the Z-axis may represent a height (or thickness) direction of the electronic device. In the following description, a "first direction" may refer to a direction parallel to the Z-axis.

Referring to FIGS. 2A and 2B, in an embodiment, the electronic device 200 may include a foldable housing 201 and a flexible or foldable display 250 (hereinafter, the "display" 250 in short) (e.g., the display module 160 of FIG. 1) disposed in a space formed by the foldable housing 201. A surface on which the display 250 is disposed (or a surface on which the display 250 is viewed from the outside of the electronic device 200) may be defined as a front surface of the electronic device 200. In addition, a surface opposite to the front surface may be defined as a rear surface of the electronic device 200. Further, a surface surrounding a space between the front surface and the rear surface may be defined as a side surface of the electronic device 200.

According to an embodiment, the foldable housing 201 may include a first housing structure 210, a second housing structure 220 including a sensor area 222, a first rear cover 215, a second rear surface 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2A and 2B, and may be implemented in a different shape(s) or a different combination(s) of components. For example, in an embodiment, the first housing structure 210 and the first rear cover 215 may be integrally formed, and the second housing structure 220 and the second rear cover 225 may be integrally formed.

According to an embodiment, the first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

According to an embodiment, the first surface may face the third surface in a state in which the electronic device 200 is fully folded and the third direction may be identical to the first direction in a state in which the electronic device 200 is fully unfolded.

According to an embodiment, the first housing structure 210 and the second housing structure 220 are disposed on both sides with respect to a folding axis A and generally may be symmetrical with respect to the folding axis A. As to be described hereinafter, an angle or distance between the first housing structure 210 and the second housing structure 220 may vary depending on whether the state of the electronic device 200 is the unfolded state, the folded state, or a partially unfolded or folded state (or an intermediate state). According to an embodiment, unlike the first housing structure 210, the second housing structure 220 may additionally include the sensor area 222, in which various sensors are arranged, however, the first housing structure 210 and the second housing structure 220 may have shapes symmetrical to each other in areas other than the sensor area 222.

According to an embodiment, as shown in FIG. 2A, the first housing structure 210 and the second housing structure 220 may together form a recess for accommodating the display 250. In an embodiment, due to the sensor area 222, the recess may have at least two different widths in a direction perpendicular to the folding axis A. For example, the recess may have a first width W1 between a first portion 210a of the first housing structure 210 parallel to the folding axis A and a first portion 220a of the second housing structure 220 formed on a periphery of the sensor area 222, and a second width W2 formed by a second portion 210b of the first housing structure 210 and a second portion 220b of the second housing structure 220 not corresponding to the sensor area 222 and being parallel to the folding axis A. In this case, the second width W2 may be greater than the first width W1. In an embodiment, the first portion 220a and the second portion 220b of the second housing structure 220 may be at different distances from the folding axis A. The widths of the recess are not limited to the shown example. In an embodiment, the recess may have a plurality of widths according to the shape of the sensor area 222 or asymmetrical portions of the first housing structure 210 and the second housing structure 220. According to an embodiment, the sensor area 222 may be formed to have a predetermined area adjacent to one corner of the second housing structure 220. However, the arrangement, shape, and size of the sensor area 222 are not limited to the shown example. For example, in an embodiment, the sensor area 222 may be provided at another corner of the second housing structure 220 or in a predetermined area between an upper corner and a lower corner. In an embodiment, components embedded in the electronic device 200 to perform various functions may be exposed to the front surface of the electronic device 200 through the sensor area 222 or through one or more openings provided in the sensor area 222. In an embodiment, the components may include various types of sensors. The sensors may include, for example, at least one of a front camera, a receiver, or a proximity sensor. According to an embodiment, the sensor area 222 may not be included in the second housing structure 220 or may be formed at a position different from that shown in the drawings.

According to an embodiment, at least a portion of the first housing structure 210 and the second housing structure 220 may be formed of a metal material or a non-metal material having a selected magnitude of rigidity to support the display 250. At least a portion formed of the metal material may provide a ground plane for the electronic device 200, and may be electrically connected to a ground line formed on a printed circuit board (PCB) disposed inside the foldable housing 201.

According to an embodiment, the first rear cover 215 may be disposed on one side of the folding axis A on a rear surface of the electronic device 200, and may have, for example, a substantially rectangular periphery that may be surrounded by the first housing structure 210. Similarly, the second rear cover 225 may be disposed on the other side of the folding axis A on the rear surface of the electronic device 200, and may have a periphery that may be surrounded by the second housing structure 220.

According to an embodiment, the first rear cover 215 and the second rear cover 225 may be substantially symmetrical with respect to the folding axis A. However, the first rear cover 215 and the second rear cover 225 are not necessarily mutually symmetrical. In an embodiment, the electronic device 200 may include a first rear cover 215 and a second rear cover 225 in various shapes. In an embodiment, the first rear cover 215 may be formed integrally with the first housing structure 210, and the second rear cover 225 may be formed integrally with the second housing structure 220.

According to an embodiment, the first rear cover 215, the second rear cover 225, the first housing structure 210, and the second housing structure 220 may form a space in which various components (e.g., a PCB, or a battery) of the electronic device 200 are to be disposed. In an embodiment, one or more components may be disposed or visually exposed on the rear surface of the electronic device 200. For example, at least a portion of a sub-display may be visually exposed through a first rear area 216 of the first rear cover 215. In an embodiment, one or more components or sensors may be visually exposed through a second rear area 226 of the second rear cover 225. In an embodiment, the sensors may include a proximity sensor and/or a rear camera.

According to an embodiment, a front camera exposed to the front surface of the electronic device 200 through one or more openings provided in the sensor area 222, or a rear camera exposed through the second rear area 226 of the second rear cover 225 may include one or more lenses, an image sensor, and/or an image signal processor. A flash may include, for example, a light-emitting diode (LED) or a xenon lamp. In an embodiment, two or more lenses (e.g., infrared camera, wide-angle, and telephoto lenses) and image sensors may be disposed on one surface of the electronic device 200.

Referring to FIG. 2B, the hinge cover may be disposed between the first housing structure 210 and the second housing structure 220 to cover internal components (e.g., the hinge structure 230). According to an embodiment, the hinge structure 230 may be covered by a portion of the first housing structure 210 and a portion of the second housing structure 220, or may be exposed to the outside, depending on the state (e.g., the unfolded state, the intermediate state, or the folded state) of the electronic device 200.

For example, when the electronic device 200 is in the unfolded state (e.g., the fully unfolded state) as illustrated in FIG. 2A, the hinge structure 230 may be covered by the first housing structure 210 and the second housing structure 220 so as not to be exposed. In an embodiment, when the electronic device 200 is in the folded state (e.g., a fully folded state), as shown in FIG. 2B, the hinge structure 230 may be exposed to the outside between the first housing structure 210 and the second housing structure 220. In an embodiment, when the first housing structure 210 and the second housing structure 220 are in the intermediate state where the first housing structure 210 and the second housing structure 220 are folded with a certain angle, a portion of the hinge structure 230 may be exposed to the outside between the first housing structure 210 and the second housing structure 220. However, the area exposed in this example may be smaller than that in the fully folded state. In an embodiment, the hinge structure 230 may include a curved surface.

According to an embodiment, the display 250 may be disposed in a space formed by the foldable housing 201. For example, the display 250 may be seated in the recess formed by the foldable housing 201 and may be viewed from the outside through the front surface of the electronic device 200. For example, the display 250 may constitute most of the front surface of the electronic device 200. Accordingly, the front surface of the electronic device 200 may include the display 250, and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to an embodiment, the display 250 may refer to a display in which at least one area is deformable into a planar surface or a curved surface. In an embodiment, the display 250 may include a folding area 253, a first area 251 disposed on one side of the folding area 253 (e.g., on the left side of the folding area 253 shown in FIG. 2A), and a second area 252 disposed on the other side of the folding area 253 (e.g., on the right side of the folding area 253 shown in FIG. 2A).

However, the area division of the display 250 shown in FIG. 2A is merely an example, and the display 250 may be divided into a plurality of areas (e.g., four or more areas, or two areas) depending on the structure or functions thereof. In an embodiment, as shown in FIG. 2A, the display 250 may be divided into areas based on the folding area 203 extending in parallel to the folding axis A. In an embodiment, the display 250 may be divided into areas based on another folding axis (e.g., a folding axis parallel to a width direction of an electronic device).

According to an embodiment, the display 250 may be coupled to or disposed adjacent to a touch panel in which a touch sensing circuit and a pressure sensor configured to measure an intensity (or pressure) of a touch are provided. For example, the display 250 is an example of a touch panel, and may be coupled to or disposed adjacent to a touch panel for detecting an electromagnetic resonance (EMR) type stylus pen.

According to an embodiment, the first area 251 and the second area 252 may generally have symmetrical shapes with respect to the folding area 253. However, unlike the first area 251, the second area 252 may include a notch cut according to inclusion of the sensor area 222, but the other areas of the second area 252 may be symmetrical to the first area 251. For example, the first area 251 and the second area 252 may include mutually symmetrical portions and mutually asymmetrical portions.

According to an embodiment, an edge thickness of each of the first area 251 and the second area 252 may be different from an edge thickness of the folding area 253. The edge thickness of the folding area 253 may be less than those of the first area 251 and the second area 252. For example, the first area 251 and the second area 252 may be asymmetrical in terms of thickness when cross-sectionally viewed. For example, an edge of the first area 251 may be formed to have a first radius of curvature and an edge of the second area 252 may be formed to have a second radius of curvature that is different from the first radius of curvature. In another example, the first area 251 and the second area 252 may be symmetrical in terms of thickness when cross-sectionally viewed.

Hereinafter, each area of the display 250 and operations of the first housing structure 210 and the second housing structure 220 depending on the state (e.g., a folded state, an unfolded state, or an intermediate state) of the electronic device 200) will be described.

According to an embodiment, when the electronic device 200 is in the unfolded state (e.g., FIG. 2A), the first housing structure 210 and the second housing structure 220 may be arranged to face the same direction with an angle of 180 degrees therebetween. The surface of the first area 251 of the display 250 and the surface of the second area 252 thereof may face the same direction (e.g., a front direction of an electronic device) with an angle of 180 degrees. The folding area 253 may be in the same plane together with the first area 251 and the second area 252.

According to an embodiment, when the electronic device 200 is in the folded state (e.g., FIG. 2B), the first housing structure 210 and the second housing structure 220 may be arranged to face each other. The surface of the first area 251 and the surface of the second area 252 of the display 250 may face each other and may form a narrow angle (e.g., an angle between 0 degrees to 10 degrees). At least a portion of the folding area 253 may form a curved surface having a predetermined curvature.

According to an embodiment, when the electronic device 200 is in the intermediate state, the first housing structure 210 and the second housing structure 220 may be arranged to form a certain angle therebetween. The surface of the first area 251 and the surface of the second area 252 of the display 250 may form an angle greater than that in the folded state and smaller than that in the unfolded state. At least a portion of the folding area 253 may include a curved surface having a predetermined curvature, and the curvature may be less than that in the folded state.

The upper part of FIG. 2C illustrates a fully unfolded state of the electronic device 200 and the lower part of FIG. 2C illustrates a partially folded state, that is, an intermediate state of the electronic device 200. As described above, the state of the electronic device 200 may be changed to the folded state or the unfolded state. According to an embodiment, when viewed in a direction of a folding axis (e.g., the folding axis A of FIG. 2A), the electronic device 200 may be folded in two types, i.e., an "in-folding" type in which the front surface of the electronic device 200 is folded to form an acute angle, and an "out-folding" type in which the front surface of the electronic device 200 is folded to form an obtuse angle. In an embodiment, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the z-axis).

In an embodiment, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2A and another axis parallel to the folding axis A). In this example, the electronic device 200 may also be folded in a "multi-folding" type in which the in-folding type is combined with the out-folding type.

The in-folding type may refer to a state in which the display 250 is not exposed to the outside in the fully folded state. The out-folding type may refer to a state in which the display 250 is exposed to the outside in the fully folded state. The lower part of FIG. 2C shows an intermediate state in which the electronic device 200 is partially unfolded in an in-folding process.

Although the state in which the electronic device 200 is folded in the in-folding type will be described below for convenience's sake, it should be noted that the description may be similarly applied to the state in which the electronic device 200 is folded in the out-folding type.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those electronic devices described or mentioned above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "1st", "2nd", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply refers to, for example, a storage medium that is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
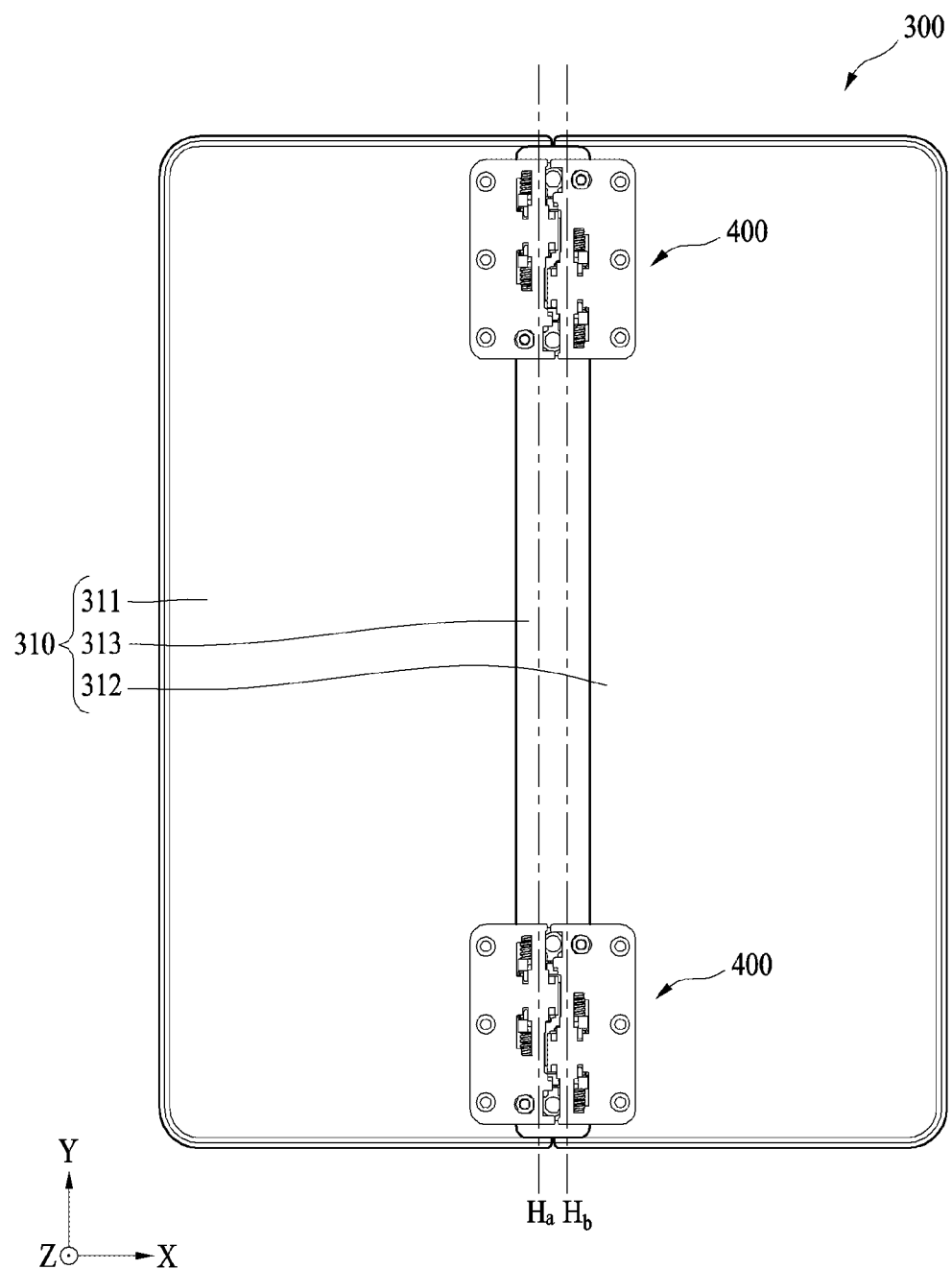
FIG. 3 is a front view illustrating a state in which an example hinge assembly is applied to an example electronic device according to various embodiments.

FIG. 3 is a front view illustrating a state in which an example hinge assembly is applied to an example electronic device according to various embodiments.

Referring to FIG. 3, an electronic device 300 (e.g., the electronic device 101 of FIG. 1 or the electronic device 200 of FIGS. 2A through 2C) according to an embodiment may be a foldable electronic device. For example, the electronic device 300 may be folded or unfolded based on a pair of hinge axes $H_a$ and $H_b$. The pair of hinge axes $H_a$ and $H_b$ may be substantially parallel with each other. However, FIG. 3 is merely an example, and the size, the shape, the structure, and the hinge axes of the electronic device 300 are not limited thereto. For example, the electronic device 300 of FIG. 3 may include the hinge axis $H_a$ or $H_b$ in the y direction, which is a long side direction, however, an electronic device according to an embodiment may also include a hinge axis in the x direction, which is a short side direction. The hinge axes $H_a$ and $H_b$ according to an embodiment may include a virtual axis provided inside or outside of the electronic device 300. For example, the hinge axes $H_a$ and $H_b$ may be a virtual axis spaced apart from the electronic device 300 in the +z-axis direction by a predetermined distance. However, this is merely an example and the shapes and/or the types of the hinge axes $H_a$ and $H_b$ are not limited thereto.

The electronic device 300 according to an embodiment may include a housing 310 (e.g., the foldable housing 201 of FIGS. 2A, 2B, and 2C), a display (not shown) (e.g., the display module 160 of FIG. 1, or the display 250 of FIGS. 2A through 2C), and a hinge assembly 400.

In an embodiment, the housing 310 may form at least a portion of an exterior of the electronic device 300. The housing 310 may include a first housing 311 (e.g., the first housing structure 210 of FIGS. 2A, 2B, and 2C), a second housing 312 (e.g., the second housing structure 220 of FIGS. 2A, 2B, and 2C), and a hinge housing 313.

In an embodiment, the first housing 311 and the second housing 312 may be foldably connected to each other by the hinge assembly 400. An angle or distance between the first housing 311 and the second housing 312 may vary depending on whether the electronic device 300 is in a flat state or unfolded state, a folded state, or an intermediate state. The intermediate state described above may include all states between the unfolded state and the folded state. The hinge housing 313 may be disposed between the first housing 311 and the second housing 312 to provide a space for mounting internal components (e.g., the hinge assembly 400). For example, the hinge housing 313 may be configured to cover the hinge assembly 400 such that the hinge assembly 400 is not exposed to the outside.

In an embodiment, the first housing 311 and the second housing 312 may provide a space in which the display 250 is disposed. The display 250 may be a foldable flexible display. For example, the display 250 may include a first area (e.g., the first area 251 of FIG. 2C), a second area (e.g., the second area 252 of FIG. 2C), and a folding area (e.g., the folding area 253 of FIG. 2C) between the first area and the second area. The first housing 311 may be disposed at a position corresponding to the first area 251 of the display 250 to support the first area 251 of the display 250. The second housing 312 may be disposed at a position corresponding to the second area 252 of the display 250 to support the second area 252 of the display 250.

In an embodiment, the hinge assembly 400 may be disposed between the first housing 311 and the second housing 312 to connect the first housing 311 to the second housing 312. For example, the hinge structure 230 of FIG. 2B may include a plurality of hinge assemblies 400. The plurality of hinge assemblies 400 may be spaced apart from each other in the hinge axis $H_a$ or $H_b$ direction (e.g., the y direction). For example, as shown in FIG. 3, two hinge assemblies 400 may be spaced apart along the hinge axis $H_a$ or $H_b$. However, this is merely an example, and the number of hinge assemblies 400 is not limited thereto. The hinge assembly 400 may implement folding or unfolding operations of the electronic device 300. The hinge assembly 400 may operate between a folded state in which the first area 251 and the second area 252 face each other and an unfolded state in which the first area 251 and the second area 252 do not face each other. The hinge assembly 400 may generate a force to maintain a specific folded state of the electronic device 300. For example, when the electronic device 300 is in the folded state, the hinge assembly 400 may generate a force for allowing the electronic device 300 to remain in the folded state. When the electronic device 300 is in the unfolded state, the hinge assembly 400 may generate a force for allowing the electronic device 300 to remain in the unfolded state. When the electronic device 300 is in the intermediate state, the hinge assembly 400 may generate a force for allowing the electronic device 300 to remain in the intermediate state.

Figure 4A:
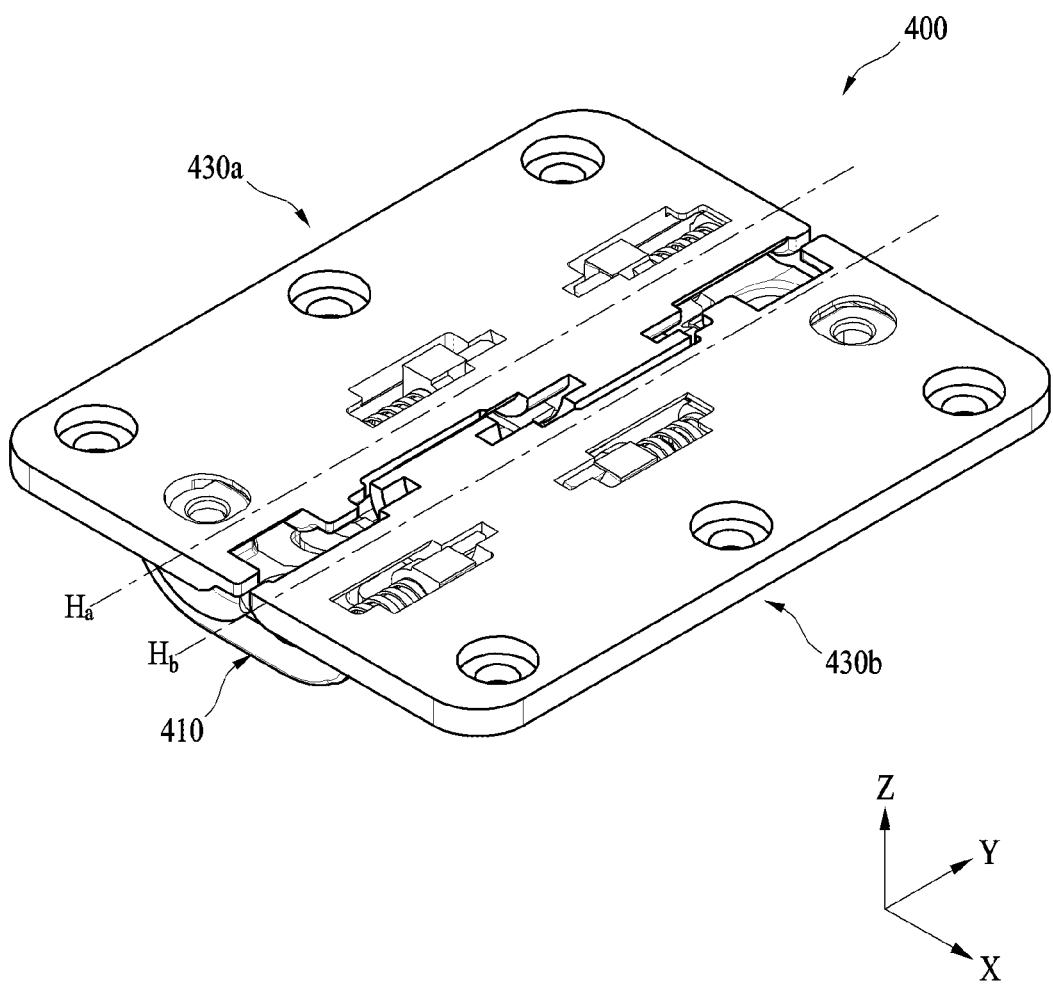
FIG. 4A is a perspective view illustrating an unfolded state of an example hinge assembly according to various embodiments.
Figure 4B:
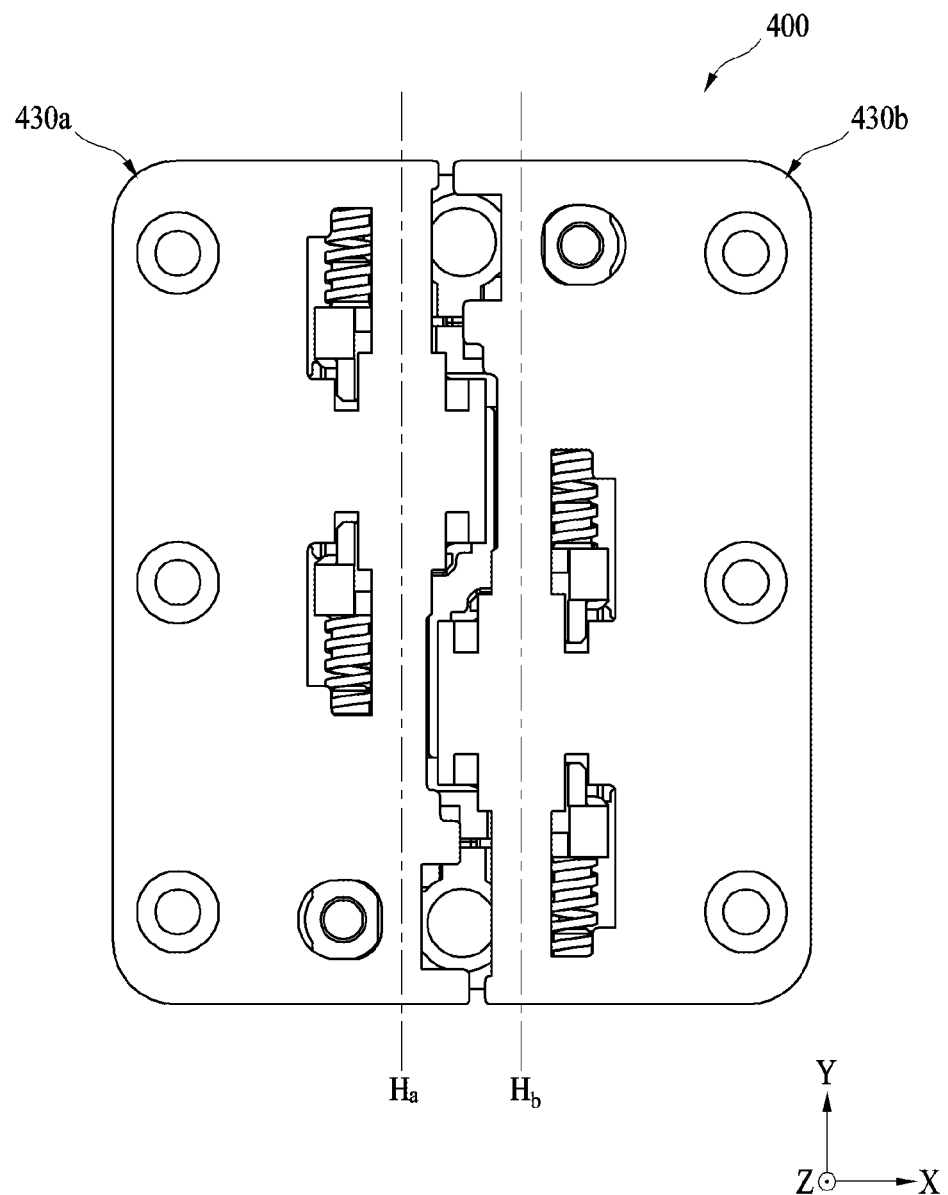
FIG. 4B is a front view illustrating an unfolded state of an example hinge assembly according to various embodiments.
Figure 4C:
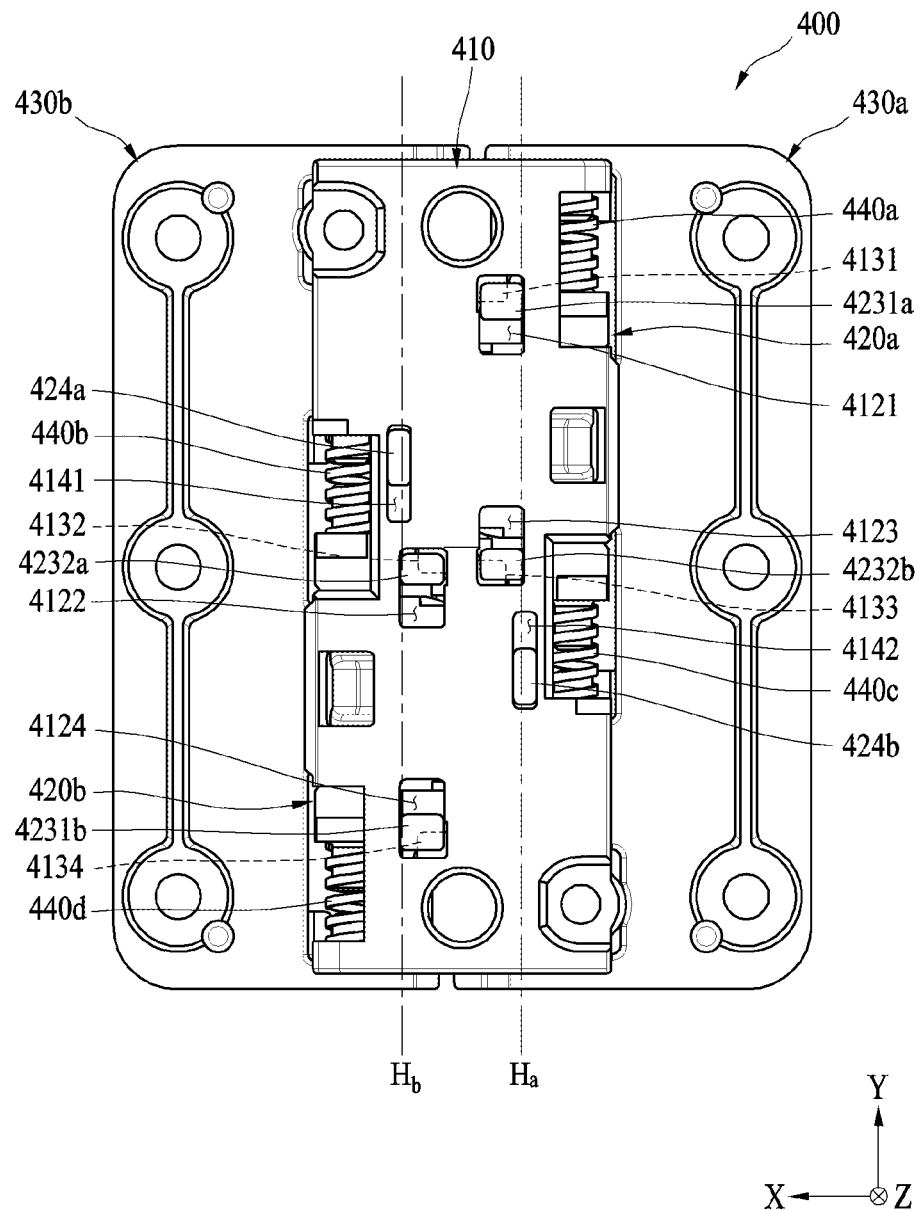
FIG. 4C is a rear view illustrating an unfolded state of an example hinge assembly according to various embodiments.
Figure 4D:
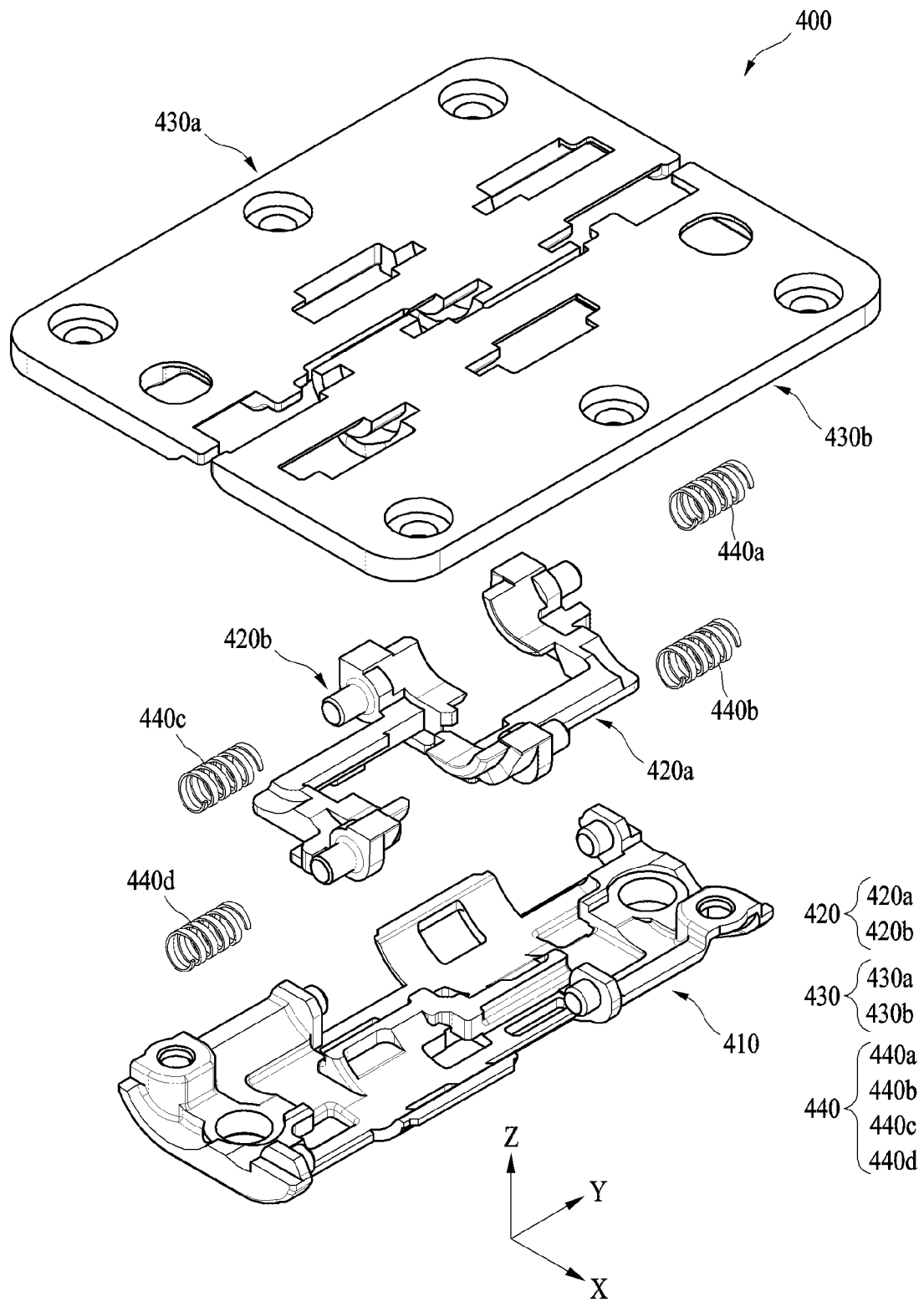
FIG. 4D is an exploded perspective view illustrating an example hinge assembly according to various embodiments.

FIG. 4A is a perspective view illustrating an unfolded state of an example hinge assembly according to various embodiments. FIG. 4B is a front view illustrating an unfolded state of an example hinge assembly according to various embodiments. FIG. 4C is a rear view illustrating an unfolded state of an example hinge assembly according to various embodiments. FIG. 4D is an exploded perspective view illustrating an example hinge assembly according to various embodiments.

Referring to FIGS. 4A, 4B, 4C, 4D, and 4E, the hinge assembly 400 may include a hinge bracket 410, a slider 420, a rotator 430, and an elastic member 440.

Figure 4E:
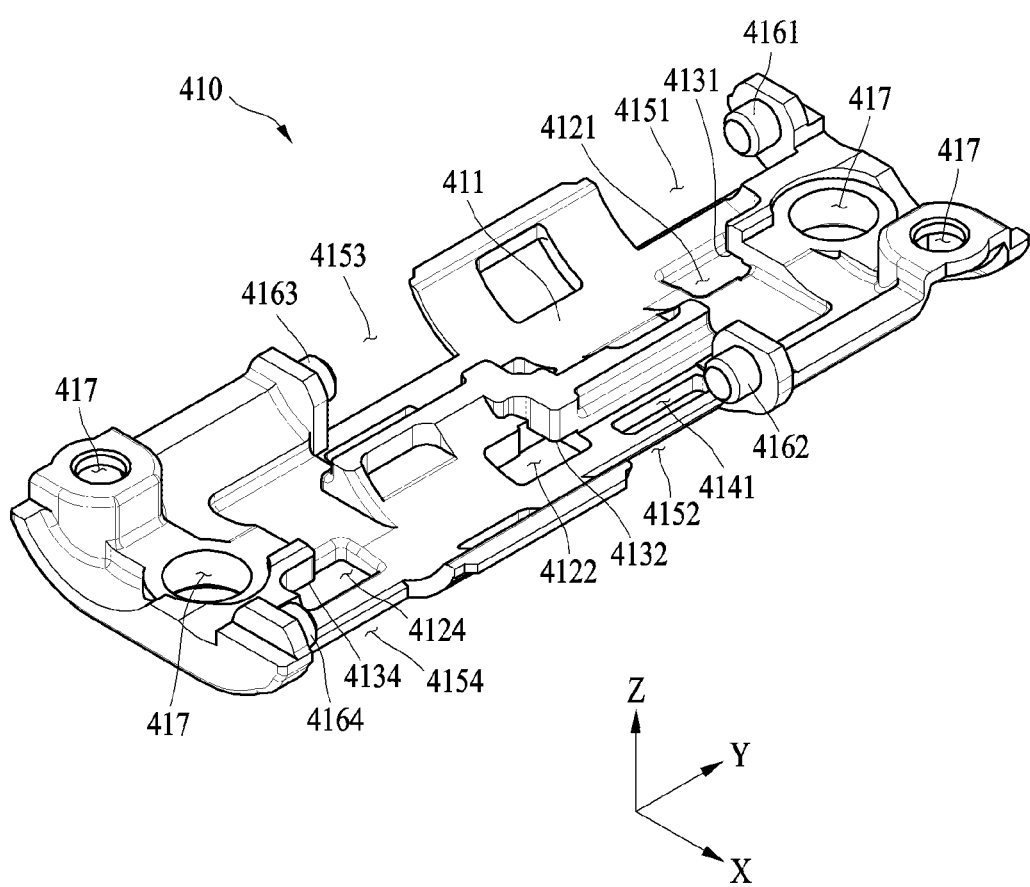
FIG. 4E is a perspective view illustrating an example hinge bracket according to various embodiments.
Figure 4F:
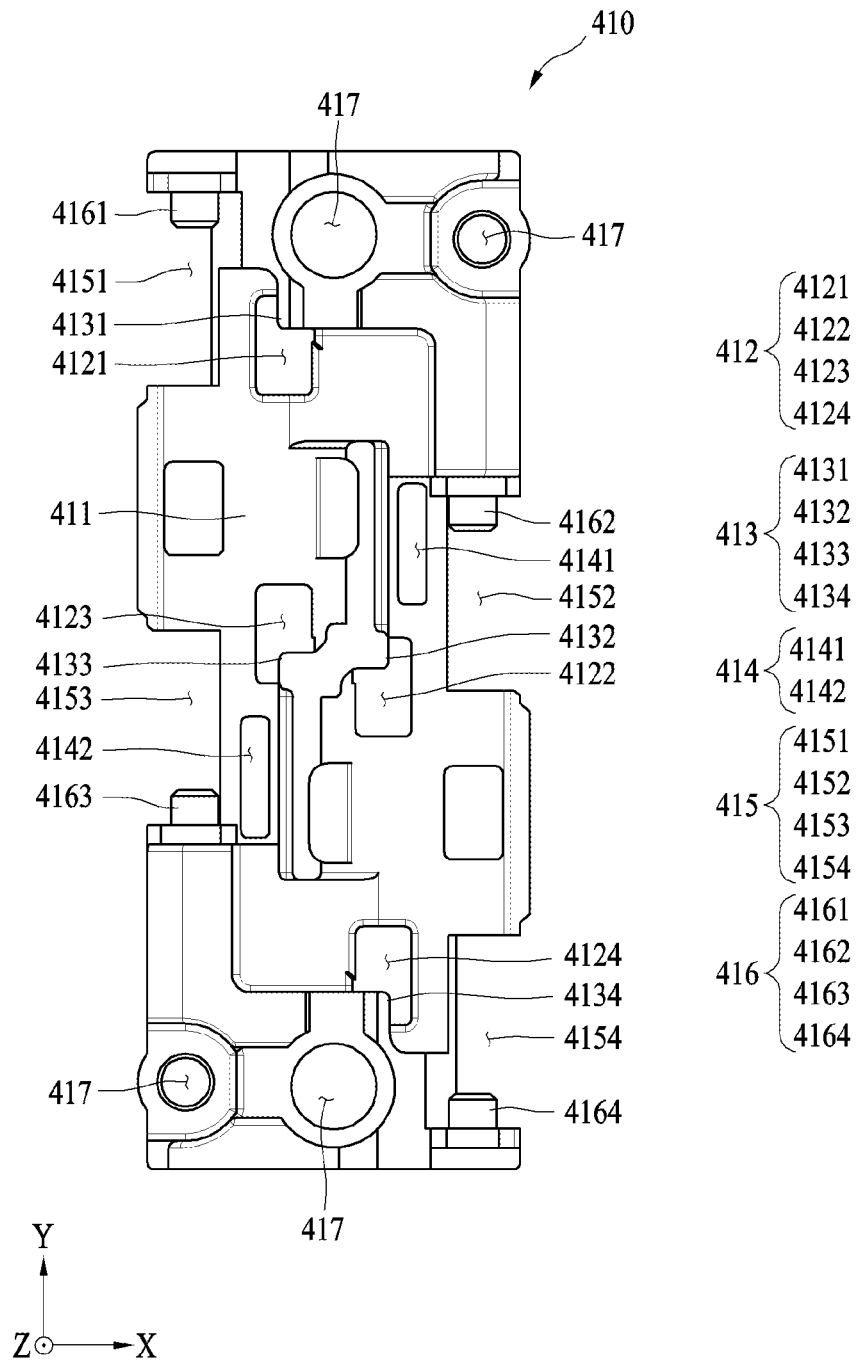
FIG. 4F is a front view illustrating an example hinge bracket according to various embodiments.
Figure 4G:
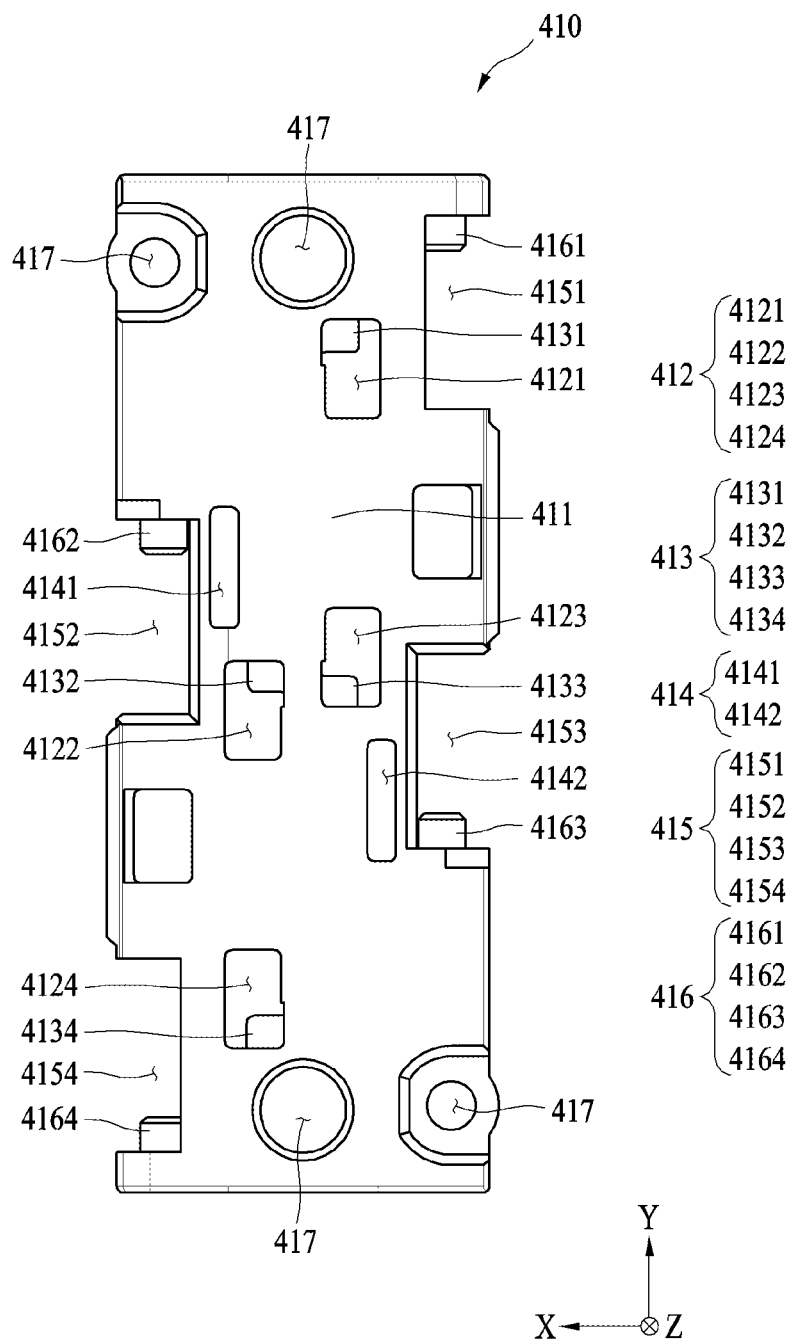
FIG. 4G is a rear view illustrating an example hinge bracket according to various embodiments.

FIG. 4E is a perspective view illustrating an example hinge bracket according to various embodiments. FIG. 4F is a front view illustrating an example hinge bracket according to various embodiments. FIG. 4G is a rear view illustrating an example hinge bracket according to various embodiments.

Referring to FIGS. 4A, 4B, 4C, 4D, 4E, 4F, and 4G, the hinge bracket 410 may be configured to be fixedly connected to a housing (e.g., the housing 310 of FIG. 3). For example, the hinge bracket 410 may be fixedly connected to the hinge housing (e.g., the hinge housing 313 of FIG. 3).

In an embodiment, the hinge bracket 410 may include a bracket body 411, a slider connection hole 412, a sliding rail 413, a sliding guide rail 414, an elastic member connection space 415, an elastic member support protrusion 416, and a bracket fastening hole 417.

In an embodiment, the bracket body 411 may form an exterior of the hinge bracket 410. The bracket body 411 may be formed to have a longitudinal direction (e.g., the y direction) parallel with the hinge axis $H_a$ or $H_b$. The bracket body 411 may provide a space for arranging the slider 420, which is described below. The rear surface (e.g., a surface in the −z direction) of the bracket body 411 may be formed to substantially correspond to an inner shape of a hinge housing (e.g., the hinge housing 313 of FIG. 3).

In an embodiment, the slider connection hole 412 may be a hole for connecting the slider 420, which is described below, to the hinge bracket 410. The slider connection hole 412 may penetrate the bracket body 411 from the front surface (e.g., the surface in the +z direction) toward the rear surface (e.g., the surface in the −z direction) of the bracket body 411. The slider connection hole 412 may be formed to have a longitudinal direction (e.g., the y direction) parallel with the hinge axis $H_a$ or $H_b$. A single or a plurality of slider connection holes 412 may be formed.

In an embodiment, the slider connection hole 412 may include a first slider connection hole 4121, a second slider connection hole 4122, a third slider connection hole 4123, and a fourth slider connection hole 4124. The first slider connection hole 4121 and the second slider connection hole 4122 may be a space for connecting a first slider 420a, and the third slider connection hole 4123 and the fourth slider connection hole 4124 may be a space for connecting a second slider 420b. Referring to FIG. 4F, the first slider connection hole 4121 and the third slider connection hole 4123 may be formed in the relatively left side portion (e.g., the portion in the −x direction) of the bracket body 411 and the second slider connection hole 4122 and the fourth slider connection hole 4124 may be formed in the relatively right side portion (e.g., the portion in the +x direction) of the bracket body 411. Referring to FIG. 4F, the first slider connection hole 4121 may be formed on the relatively upper side (e.g., the portion in the +y direction) of the bracket body 411, the second slider connection hole 4122 and the third slider connection hole 4123 may be formed near the central portion of the bracket body 411, and the fourth slider connection hole 4124 may be formed on the relatively lower side (e.g., the portion in the −y direction) of the bracket body 411. However, this is merely an example, and the number, shape, and/or location of the slider connection hole 412 is not limited thereto.

In an embodiment, the sliding rail 413 may be configured to slidably connect the slider 420 to the hinge bracket 410. The sliding rail 413 may interoperate with a sliding protrusion (e.g., a sliding protrusion 423 of FIG. 4I), which is described below, of the slider 420. The sliding rail 413 may be formed to have a longitudinal direction (e.g., the y direction) parallel with the hinge axis $H_a$ or $H_b$. The length of the sliding rail 413 in the longitudinal direction (e.g., the y direction) may define the length of a section in which the slider 420 slides in the hinge axis $H_a$ or $H_b$ direction (e.g., the y direction). The sliding rail 413 may protrude by a predetermined width in a direction perpendicular to the hinge axis $H_a$ or $H_b$ from the slider connection hole 412.

In an embodiment, the sliding rail 413 may include a first sliding rail 4131, a second sliding rail 4132, a third sliding rail 4133, and a fourth sliding rail 4134. The first sliding rail 4131 may protrude by a predetermined width in the −x direction in at least a partial section of the first slider connection hole 4121 in the y direction. The second sliding rail 4132 may protrude by a predetermined width in the +x direction in at least a partial section of the second slider connection hole 4122 in the y direction. The first sliding rail 4131 and the second sliding rail 4132 may be formed near the upper side (e.g., the +y direction side) of the first slider connection hole 4121 and the upper side (e.g., the +y direction side) of the second slider connection hole 4122, respectively. The third sliding rail 4133 may protrude by a predetermined width in the −x direction in at least a partial section of the third slider connection hole 4123 in the y direction. The fourth sliding rail 4134 may protrude by a predetermined width in the +x direction in at least a partial section of the fourth slider connection hole 4124 in the y direction. The third sliding rail 4133 and the fourth sliding rail 4134 may be formed near the lower side (e.g., the −y direction side) of the third slider connection hole 4123 and the lower side (e.g., the −y direction side) of the fourth slider connection hole 4124, respectively. However, this is an example, and the number, shape, and/or location of the sliding rail 413 is not limited thereto.

In an embodiment, the sliding guide rail 414 may be configured to guide a sliding path of the slider 420. The sliding guide rail 414 may interoperate with a sliding guide protrusion (e.g., the sliding guide protrusion 424 of FIG. 4J), which is described below, of the slider 420. The sliding guide rail 414 may penetrate the bracket body 411 from the front surface (e.g., the surface in the +z direction) toward the rear surface (e.g., the surface in the −z direction) of the bracket body 411. The sliding guide rail 414 may be formed to have a longitudinal direction (e.g., the y direction) parallel with the hinge axis $H_a$ or $H_b$. A single or a plurality of sliding guide rails 414 may be formed.

In an embodiment, the sliding guide rail 414 may include a first sliding guide rail 4141 and a second sliding guide rail 4142. The first sliding guide rail 4141 may guide a path of the first slider 420a, and the second sliding guide rail 4142 may guide a path of the second slider 420b. Referring to FIG. 4F, the first sliding guide rail 4141 may be formed on the relatively right side portion (e.g., the portion in the +x direction) of the bracket body 411 and the second sliding guide rail 4142 may be formed on the relatively left side portion (e.g., the portion in the −x direction) of the bracket body 411. Referring to FIG. 4F, the first sliding guide rail 4141 may be formed on the relatively upper portion (e.g., the portion in the +y direction) of the bracket body 411 and the second sliding guide rail 4142 may be formed on the relatively lower portion (e.g., the portion in the −y direction) of the bracket body 411. Referring to FIG. 4F, the first sliding guide rail 4141 may be formed on a portion (e.g., the portion in the +y direction) upper (more up) than the second sliding connection hole 4122 and the second sliding guide rail 4142 may be formed on a portion (e.g., the portion in the −y direction) lower (more low) than the third sliding connection hole 4123. However, this is an example, and the number, shape, and/or location of the sliding guide rail 414 is not limited thereto.

In an embodiment, the elastic member connection space 415 may be a space for connecting the elastic member 440 to the hinge bracket 410. The elastic member connection space 415 may be formed on the side portion (e.g., the −x and/or +x direction side) of the bracket body 411. The hinge bracket 410 may be formed to have a longitudinal direction (e.g., the y direction) parallel with the hinge axis $H_a$ or $H_b$. A single or a plurality of elastic member connection spaces 415 may be formed.

In an embodiment, the elastic member connection space 415 may include a first elastic member connection space 4151, a second elastic member connection space 4152, a third elastic member connection space 4153, and a fourth elastic member connection space 4154. In an embodiment, the first elastic member connection space 4151, the second elastic member connection space 4152, the third elastic member connection space 4153, and the fourth elastic member connection space 4154 may be alternately arranged on one side (e.g., the −x direction side) and the other side (e.g., the +x direction side) of the bracket body 411 in the longitudinal direction (e.g., the y direction) of the bracket body 411 and apart from each other. For example, with reference to FIG. 4F, in a direction from the upper side (e.g., the +y direction side) to the lower side (e.g., the −y direction side) of the bracket body 411, the first elastic member connection space 4151, the second elastic member connection space 4152, the third elastic member connection space 4153, and the fourth elastic member connection space 4154 may be alternately arranged on the left side (e.g., the −x direction side) and the right side (e.g., the +x direction side) of the bracket body 411 and apart from each other. However, this is an example, and the number, shape, and/or location of the elastic member connection space 415 is not limited thereto.

In an embodiment, the elastic member support protrusion 416 may be configured to support the elastic member 440. For example, the elastic member support protrusion 416 may be substantially formed in a protrusion shape or a pin shape. The elastic member support protrusion 416 may support the elastic member 440 by inserting one side of the elastic member 440 into the elastic member support protrusion 416. The elastic member support protrusion 416 may prevent the elastic member 440 from escaping from the elastic member connection space 415. The elastic member support protrusion 416 may protrude by a predetermined length in a direction (e.g., the y direction) parallel with the hinge axis $H_a$ or $H_b$ from the elastic member connection space 415.

In an embodiment, the elastic member support protrusion 416 may include a first elastic member support protrusion 4161, a second elastic member support protrusion 4162, a third elastic member support protrusion 4163, and a fourth elastic member support protrusion 4164. For example, with reference to FIG. 4F, the first elastic member support protrusion 4161 may protrude from the upper side (e.g., the +y direction side) toward the lower side (e.g., the −y direction side) of the first elastic member connection space 4151, the second elastic member support protrusion 4162 may protrude from the upper side (e.g., the +y direction side) toward the lower side (e.g., the −y direction side) of the second elastic member connection space 4152, the third elastic member support protrusion 4163 may protrude from the lower side (e.g., the −y direction side) toward the upper side (e.g., the +y direction side) of the third elastic member connection space 4153, and the fourth elastic member support protrusion 4164 may protrude from the lower side (e.g., the −y direction side) toward the upper side (e.g., the +y direction side) of the fourth elastic member connection space 4154. However, this is merely an example, and the number, shape, and/or location of the elastic member support protrusion 416 is not limited thereto.

In an embodiment, the bracket fastening hole 417 may be a hole configured to fasten the hinge bracket 410 to a hinge housing (e.g., the hinge housing 313 of FIG. 3). For example, a fastening member (e.g., a screw, a bolt, a pin, and/or a combination fastening structure) may be inserted into the bracket fastening hole 417. A single or a plurality of bracket fastening holes 417 may be formed. For example, a plurality of bracket fastening holes 417 may be formed as illustrated in FIG. 4F. However, this is merely an example, and the number, shape, and/or location of the bracket fastening hole 417 is not limited thereto.

Figure 4H:
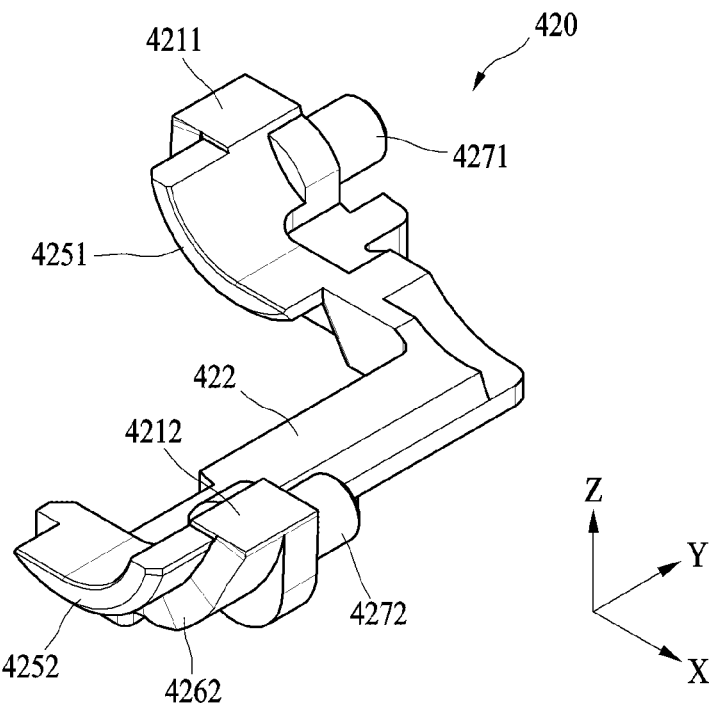
FIG. 4H is a perspective view illustrating an example slider according to various embodiments.
Figure 4I:
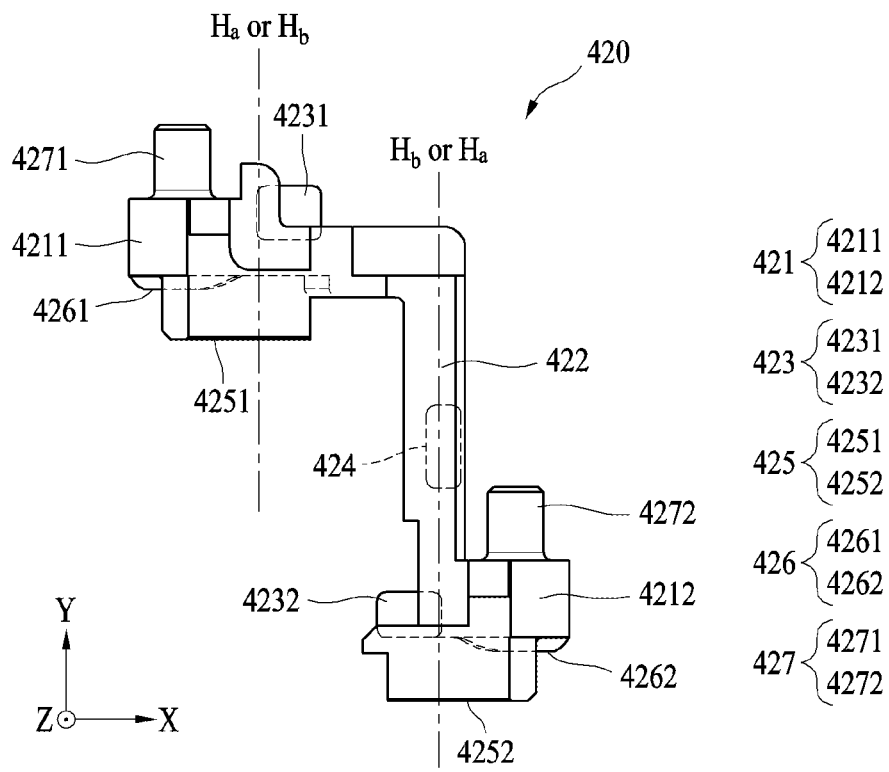
FIG. 4I is a front view illustrating an example slider according to various embodiments.
Figure 4J:
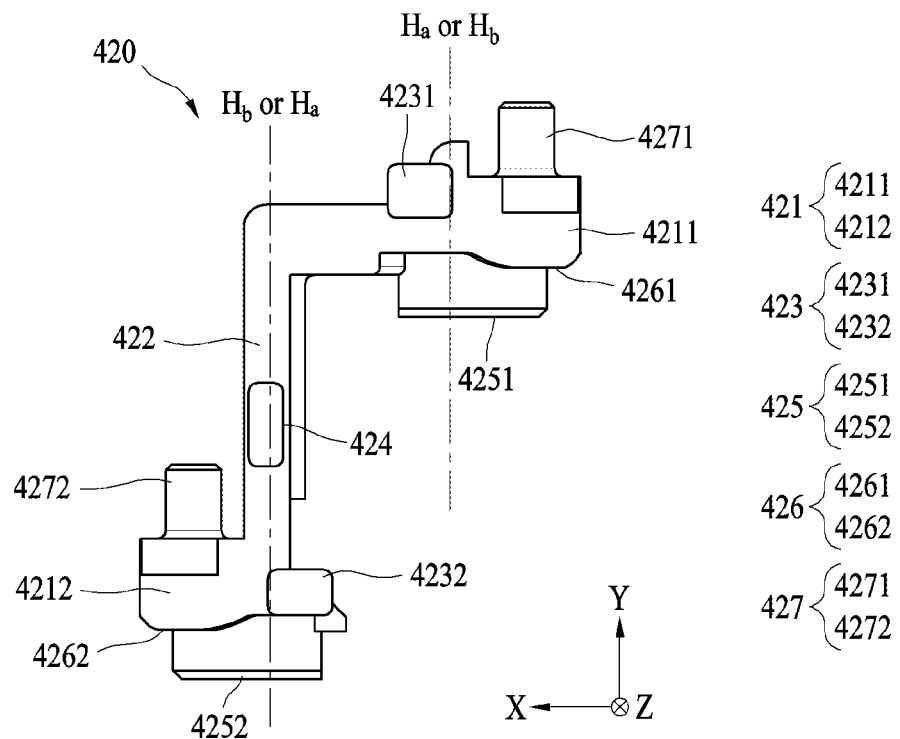
FIG. 4J is a rear view illustrating an example slider according to various embodiments.
Figure 4K:
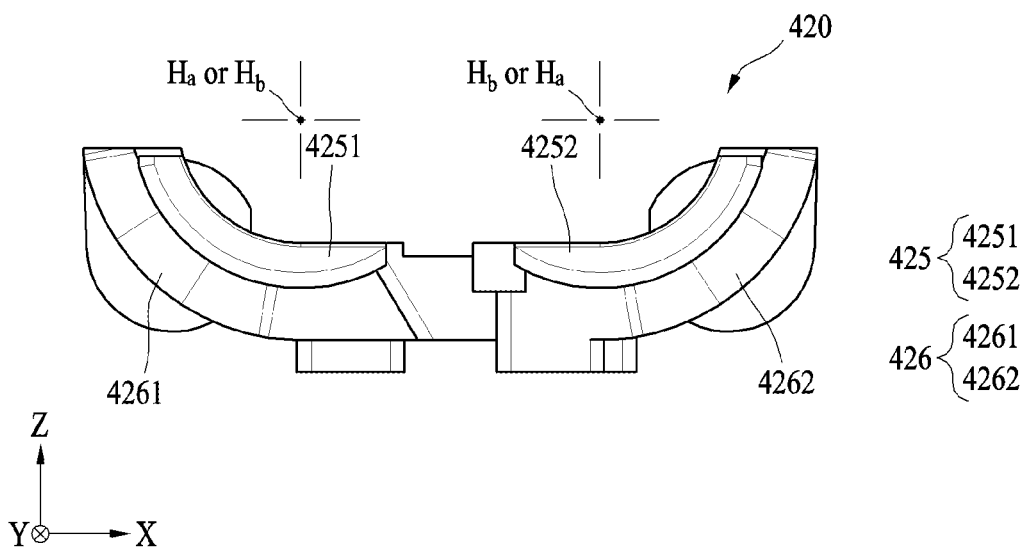
FIG. 4K is a side view illustrating an example slider according to various embodiments.

FIG. 4H is a perspective view illustrating an example slider according to various embodiments. FIG. 4I is a front view illustrating an example slider according to various embodiments. FIG. 4J is a rear view illustrating an example slider according to various embodiments. FIG. 4K is a side view illustrating an example slider according to various embodiments.

Referring to FIGS. 4A, 4B, 4C, and 4D and FIGS. 4H, 4I, 4J, and 4K, the slider 420 according to an embodiment may be slidably connected to the hinge bracket 410. The slider 420 may slide relative to the hinge bracket 410 in the hinge axis $H_a$ or $H_b$ direction (e.g., the y direction). A single or a plurality of sliders 420 may be formed. For example, a pair of sliders 420 may be provided. For example, the slider 420 may include the first slider 420a and the second slider 420b. The first slider 420a may be formed in a shape substantially the same as the shape of the second slider 420b.

In an embodiment, the slider 420 may include a main body 421, a bridge body 422, a sliding protrusion 423, the sliding guide protrusion 424, a rotation rail 425, a reference cam 426, and an elastic member support pin 427.

In an embodiment, the main body 421 and the bridge body 422 may form the external configuration of the slider 420. The sliding protrusion 423, the rotation rail 425, the reference cam 426, and/or the elastic member support pin 427 may be formed in the main body 421. For example, with reference to FIG. 4J, the rotation rail 425 and the reference cam 426 may be formed on one side (e.g., the −y direction side) of the main body 421 and the elastic member support pin 427 may be formed on the other side (e.g., the +y direction side) of the main body 421. A pair of main bodies 421 may be formed. For example, the main body 421 may include a first main body 4211 and a second main body 4212. The pair of main bodies 421 (the first and second main bodies 4211 and 4212) may be spaced apart from each other. For example, with reference to FIG. 4I, the first main body 4211 may be arranged on the upper (e.g., the +y direction side) left side (e.g., the −x direction side) and the second main body 4212 may be arranged on the lower (e.g., the −y direction side) right side (e.g., the +x direction side).

In an embodiment, the bridge body 422 may connect the first main body 4211 to the second main body 4212. For example, the bridge body 422 may be formed in a bent shape. For example, with reference to FIG. 4I, the bridge body 422 may extend in the right direction (e.g., the +x direction) from the right side (e.g., the +x direction side) of the first main body 4211 and may be bent and extend in the down direction (e.g., the −y direction) to be connected to the upper portion (e.g., the +y direction portion) of the second main body 4212. However, this is merely an example, and the number, location, and/or connection relationship of the main body 421 and the bridge body 422 is not limited thereto. For example, in an embodiment, the slider 420 may not include the bridge body 422.

In an embodiment, the slider 420 may be slidably connected to the hinge bracket 410 through the sliding protrusion 423. The sliding protrusion 423 may interoperate with a sliding rail (e.g., the sliding rail 413 of FIG. 4F) of the hinge bracket 410. A pair of sliding protrusions 423 may be provided. For example, the sliding protrusion 423 may include a first sliding protrusion 4231 and a second sliding protrusion 4232. The first sliding protrusion 4231 may be formed in the first main body 4211, and the second sliding protrusion 4232 may be formed in the second main body 4212. For example, with reference to FIG. 4I, the first sliding protrusion 4231 may protrude in the +x direction from the rear side (e.g., the −z direction side) of the first main body 4211 and the second sliding protrusion 4232 may protrude in the −x direction from the rear side (e.g., the −z direction side) of the second main body 4212. However, this is an example, and the number, shape, and/or location of the sliding protrusion 423 is not limited thereto.

In an embodiment, the sliding guide protrusion 424 may guide a sliding path of the slider 420. The sliding guide protrusion 424 may interoperate with a sliding guide rail (e.g., the sliding guide rail 414 of FIG. 4F) of the hinge bracket 410. The sliding guide protrusion 424 may be formed in the bridge body 422. For example, the sliding guide protrusion 424 may protrude in the rear direction (e.g., the −z direction) from the rear surface (e.g., the surface in the −z direction) of the bridge body 422. For example, the sliding guide protrusion 424 may be formed in a width (e.g., the x direction width) substantially corresponding to the sliding guide rail 414 of the hinge bracket 410 and may be formed to have a length (e.g., the y direction length) less than the sliding guide rail 414 of the hinge bracket 410.

In an embodiment, the rotation rail 425 may be configured to rotatably connect the rotator 430, which is described below, to the slider 420. The rotation rail 425 may interoperate with a rail groove (e.g., a rail groove 433 of FIG. 4N) of the rotator 430. A pair of rotation rails 425 may be formed. For example, the rotation rail 425 may include a first rotation rail 4251 and a second rotation rail 4252. The first rotation rail 4251 and the second rotation rail 4252 may each include an arc shape, and the center of the arc shape of the first rotation rail 4251 and the center of the arc shape of the second rotation rail 4252 may be defined as the first hinge axis $H_a$ and the second hinge axis $H_b$, respectively.

In an embodiment, the first rotation rail 4251 may be formed in the first main body 4211. For example, the first rotation rail 4251 may protrude in the lower direction (e.g., the −y direction) from the lower side surface (e.g., the surface in the −y direction) of the first main body 4211. The first rotation rail 4251 may protrude in an arc shape with the first hinge axis $H_a$ as a center. The second rotation rail 4252 may be formed in the second main body 4212. For example, the second rotation rail 4252 may protrude in the lower direction (e.g., the −y direction) from the lower side surface (e.g., the surface in the −y direction) of the second main body 4212. The second rotation rail 4252 may protrude in an arc shape with the second hinge axis $H_b$ as a center. However, this is an example, and the number, shape, and/or location of the first rotation rail 4251 and the second rotation rail 4252 is not limited thereto.

In an embodiment, the reference cam 426 may be configured to interoperate with a rotation cam (e.g., the rotation cam 434 of FIG. 4O) of the rotator 430, which is described below. A pair of reference cams 426 may be formed. For example, the reference cam 426 may include a first reference cam 4261 and a second reference cam 4262.

In an embodiment, the first reference cam 4261 may be formed in the first main body 4211. The first reference cam 4261 may protrude in the lower direction (e.g., the −y direction) from the lower side surface (e.g., the surface in the −y direction) of the first main body 4211. The first reference cam 4261 may protrude to include at least one crest and/or one trough structure. The first reference cam 4261 may be formed in the arc shape with the first hinge axis $H_a$ as a center. For example, the crest and/or the trough structure of the first reference cam 4261 may be substantially formed in the arc shape with the first hinge axis $H_a$ as a center. The first reference cam 4261 may be at the relatively rear side (e.g., −z direction side), compared to the first rotation rail 4251. The second reference cam 4262 may be formed in the second main body 4212. The second reference cam 4262 may protrude in the lower direction (e.g., the −y direction) from the lower side surface (e.g., the surface in the −y direction) of the second main body 4212. The second reference cam 4262 may protrude to include at least one crest and/or one trough structure. The second reference cam 4262 may be formed in the arc shape with the second hinge axis $H_b$ as a center. For example, the crest and/or the trough structure of the second reference cam 4262 may be substantially formed in the arc shape with the second hinge axis $H_b$ as a center. The second reference cam 4262 may be positioned at the relatively rear side (e.g., −z direction side), compared to the second rotation rail 4252.

In an embodiment, the elastic member support pin 427 may be configured to support the elastic member 440. For example, the elastic member support pin 427 may be substantially formed in a pin shape or a protrusion shape. The elastic member support pin 427 may support the elastic member 440 by inserting one side of the elastic member 440 into the elastic member support pin 427. The elastic member support pin 427 may protrude by a predetermined length in a direction (e.g., the y direction) parallel with the hinge axis $H_a$ or $H_b$ from the main body 421. A pair of elastic member support pins 427 may be formed. For example, the elastic member support pin 427 may include a first elastic member support pin 4271 and a second elastic member support pin 4272.

In an embodiment, the first elastic member support pin 4271 may be formed in the first main body 4211. The first elastic member support pin 4271 may protrude in the up direction (e.g., the +y direction) from the upper side surface (e.g., the surface in the +y direction) of the first main body 4211. The second elastic member support pin 4272 may be formed in the second main body 4212. The second elastic member support pin 4272 may protrude in the up direction (e.g., the +y direction) from the upper side surface (e.g., the surface in the +y direction) of the second main body 4212.

In an embodiment, with reference to FIG. 4C, a connection relationship between the first slider 420a and the hinge bracket 410 is described based on the first slider 420a. A first sliding protrusion 4231a and a second sliding protrusion 4232a of the first slider 420a may interoperate with the first sliding rail 4131 and the second sliding rail 4132 of the hinge bracket 410, respectively. The first slider 420a may be connected to the hinge bracket 410 such that the first sliding protrusion 4231a and the second sliding protrusion 4232a may be caught by rear surfaces (e.g., the surface in the −z direction) of the first sliding rail 4131 and the second sliding rail 4132, respectively. The first sliding protrusion 4231a and the second sliding protrusion 4232a of the first slider 420a may slide in the hinge axis $H_a$ or $H_b$ direction (e.g., the y-axis direction) respectively along the first sliding rail 4131 and the second sliding rail 4132. According to the structure described above, the first slider 420a may slide in the hinge axis $H_a$ or $H_b$ direction (e.g., the y-axis direction) relative to the hinge bracket 410. In addition, when the first slider 420a is slidably connected to the hinge bracket 410, the sliding guide protrusion 424a of the first slider 420a may be inserted into the first sliding guide rail 4141 of the hinge bracket 410. In a process in which the first slider 420a slides relative to the hinge bracket 410 in the hinge axis $H_a$ or $H_b$ direction (e.g., the y-axis direction), a sliding path of the first slider 420a relative to the hinge bracket 410 may be guided as the sliding guide protrusion 424a slides along the first sliding guide rail 4141. For example, the sliding guide protrusion 424a may prevent the first slider 420a from tilting relative to the hinge bracket 410. Moreover, it may be clearly understood by a person skilled in the art that the second slider 420b may be slidably connected to the hinge bracket 410 in substantially the same manner as the first slider 420a. For example, a first sliding protrusion 4231b and a second sliding protrusion 4232b of the second slider 420b may interoperate with the third sliding rail 4133 and the fourth sliding rail 4134 of the hinge bracket 410, respectively. In addition, a sliding guide protrusion 424b of the second slider 420b may be inserted into the second sliding guide rail 4142 of the hinge bracket 410 and may interoperate with the second sliding guide rail 4142. To avoid excessive repetition, the description of the connection relationship between the first slider 420a and the hinge bracket 410 may be applied to a connection relationship between the second slider 420b and the hinge bracket 410.

Figure 4L:
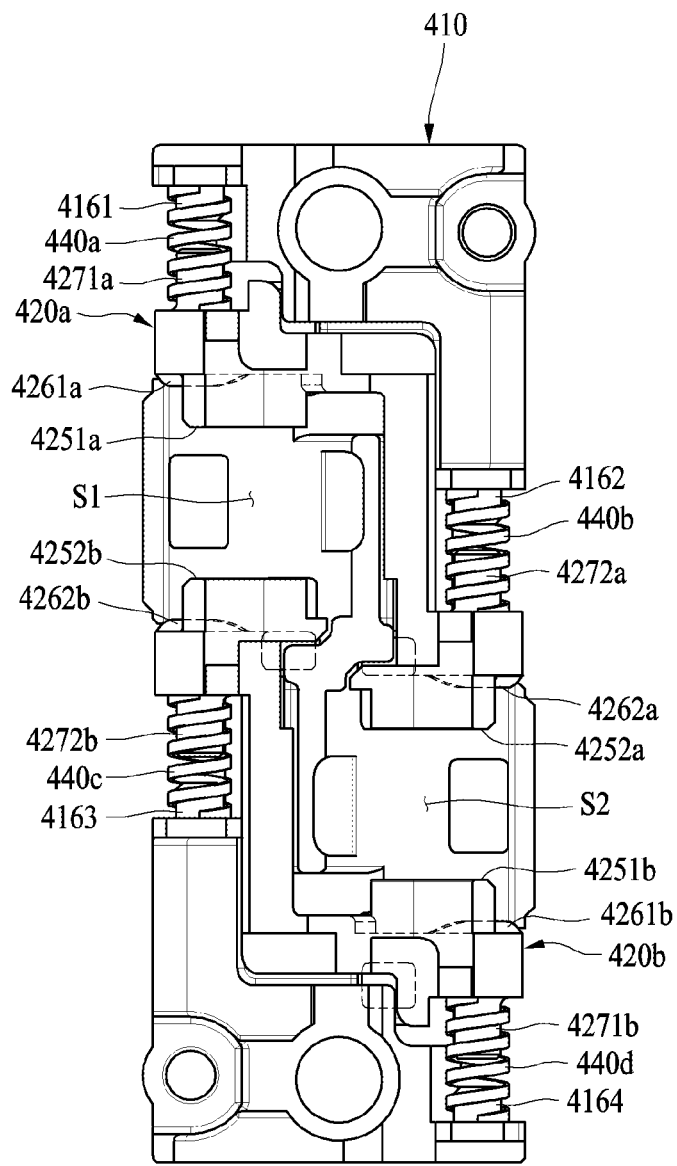
FIG. 4L is a front view illustrating a state in which an example slider and an example elastic member are coupled to an example hinge bracket, according to various embodiments.

FIG. 4L is a front view illustrating a state in which an example slider and an example elastic member are coupled to an example hinge bracket, according to various embodiments.

Referring to FIG. 4L, the first slider 420a and the second slider 420b according to an embodiment may be slidably connected to the hinge bracket 410. The first slider 420a and the second slider 420b may be arranged to face each other from opposite directions and may be spaced apart from each other. For example, the first slider 420a and the second slider 420b may be arranged in a direction in which rotation rails 4251a, 4252a, 4251b and 4252b respectively face reference cams 4261a, 4262a, 4261b, and 4262b, and may be spaced apart from each other. A first rotation rail 4251a and a first reference cam 4261a of the first slider 420a may face a second rotation rail 4252b and a second reference cam 4262b of the second slider 420b, respectively. A space S1 where a protruding body (e.g., a protruding body 432 of FIG. 4P), which is described below, of a first rotator 430a is arranged may be formed between the first rotation rail 4251a and the first reference cam 4261a of the first slider 420a and the second rotation rail 4252b and the second reference cam 4262b of the second slider 420b. A second rotation rail 4252a and a second reference cam 4262a of the first slider 420a may face a first rotation rail 4251b and a first reference cam 4261b of the second slider 420b, respectively. A space S2 where a protruding body (e.g., the protruding body 432 of FIG. 4P), which is described below, of the second rotator 430b is arranged may be formed between the second rotation rail 4252a and the second reference cam 4262a of the first slider 420a and the first rotation rail 4251b and the first reference cam 4261b of the second slider 420b. A first elastic member support pin 4271a and a second elastic member support pin 4272a of the first slider 420a may be oriented in opposite directions to a first elastic member support pin 4271b and a second elastic member support pin 4272b of the second slider 420b, respectively.

In an embodiment, when the first slider 420a is connected to the hinge bracket 410, the first elastic member support pin 4271a and the second elastic member support pin 4272a of the first slider 420a may be arranged on substantially the same axis as the first elastic member support protrusion 4161 and the second elastic member support protrusion 4162 of the hinge bracket 410, respectively. When the second slider 420b is connected to the hinge bracket 410, the first elastic member support pin 4271b and the second elastic member support pin 4272b of the second slider 420b may be arranged on substantially the same axis as the fourth elastic member support protrusion 4164 and the third elastic member support protrusion 4163 of the hinge bracket 410, respectively.

Figure 4M:
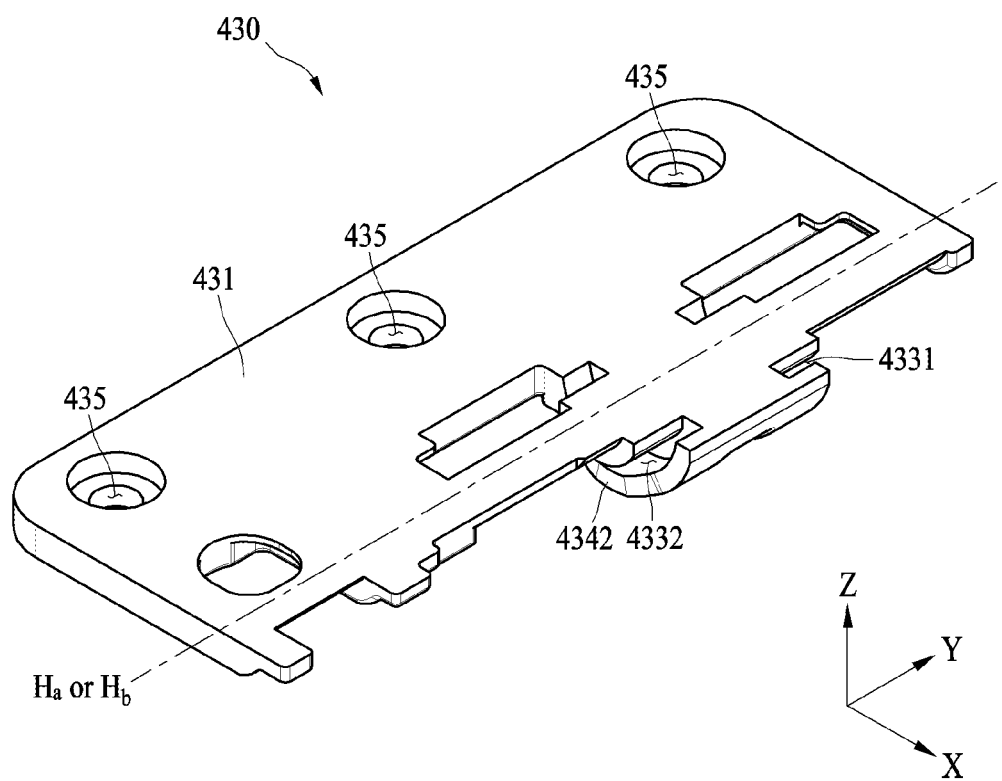
FIG. 4M is a perspective view illustrating an example rotator according to various embodiments.
Figure 4N:
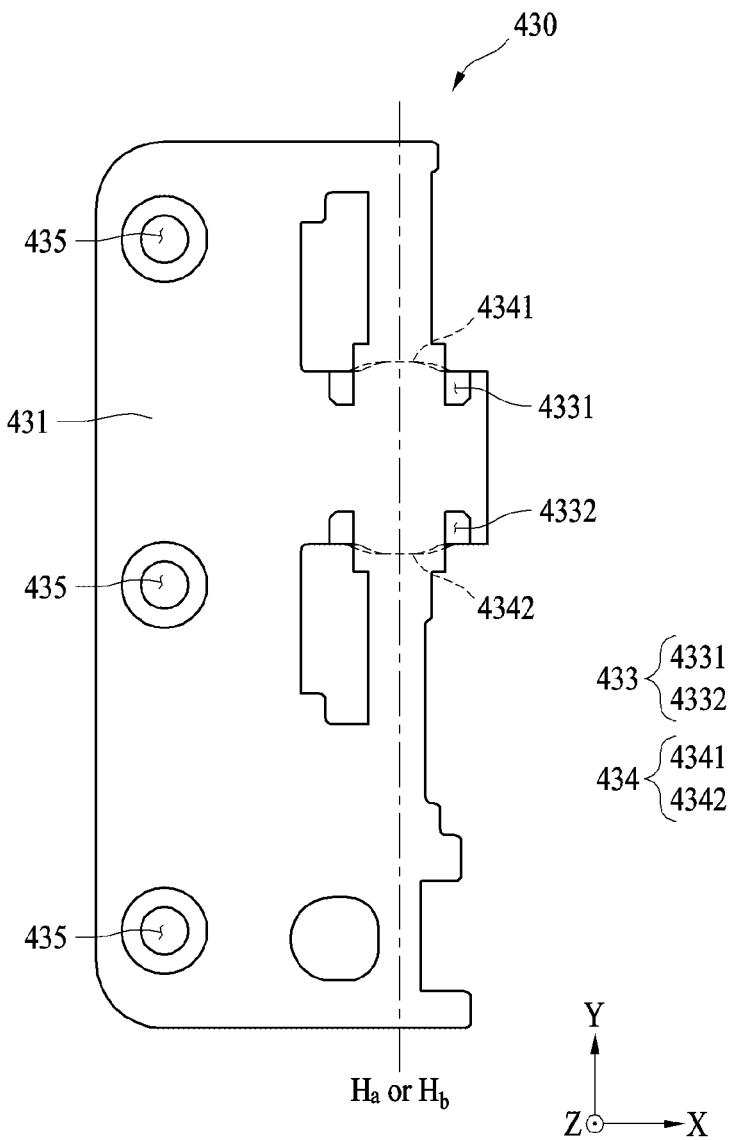
FIG. 4N is a front view illustrating an example rotator according to various embodiments.
Figure 4O:
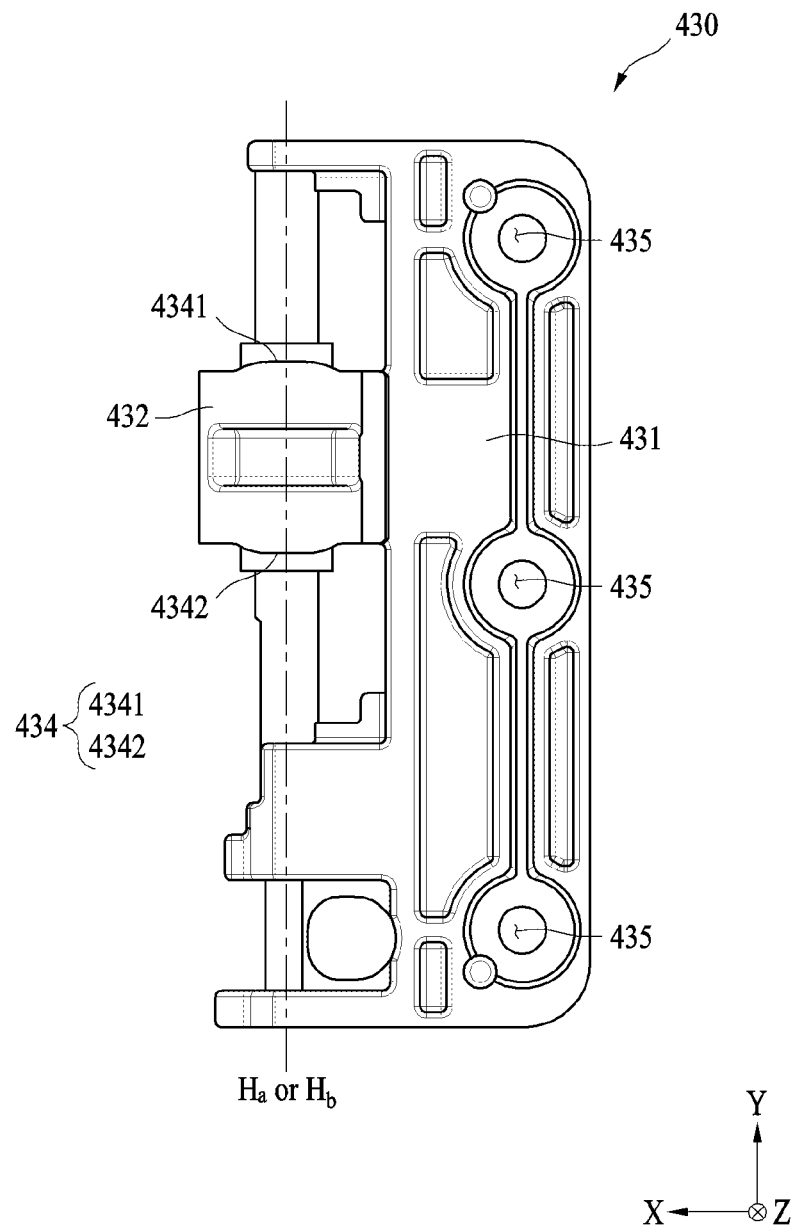
FIG. 4O is a rear view illustrating an example rotator according to various embodiments.
Figure 4P:
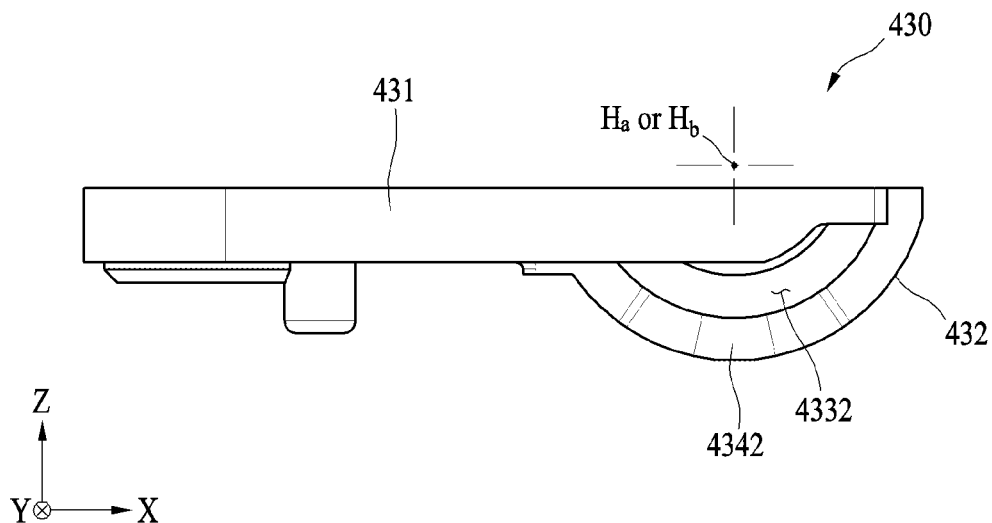
FIG. 4P is a side view illustrating an example rotator according to various embodiments.

FIG. 4M is a perspective view illustrating an example rotator according to various embodiments. FIG. 4N is a front view illustrating an example rotator according to various embodiments. FIG. 4O is a rear view illustrating an example rotator according to various embodiments. FIG. 4P is a side view illustrating an example rotator according to various embodiments.

Referring to FIGS. 4A, 4B, 4C, and 4D and 4M, 4N, 4O, and 4P, the rotator 430 according to an embodiment may be rotatably connected to the slider 420. A pair of rotators 430 may be provided. For example, the rotator 430 may include the first rotator 430a and the second rotator 430b. The first rotator 430a may be connected to the first slider 420a and the second slider 420b, such that the first rotator 430a may rotate around the first hinge axis $H_a$. The second rotator 430b may be connected to the first slider 420a and the second slider 420b, such that the second rotator 430b may rotate around the second hinge axis $H_b$. The first slider 420a may be formed in a shape substantially the same as the shape of the second slider 420b.

In an embodiment, the rotator 430 may include a rotator body 431, a protruding body 432, a rail groove 433, a rotation cam 434, and a housing fastening hole 435.

In an embodiment, the rotator body 431 may form the external figure of the rotator 430. The rotator body 431 may be substantially formed in a plate shape. The rotator body 431 may be fixedly connected to a first housing (e.g., the first housing 311 of FIG. 3) or a second housing (e.g., the second housing 312 of FIG. 3). The rotator body 431 may be substantially arranged in parallel with the front surface (e.g., the +z direction surface with reference to FIG. 3) of the first housing 311 or the second housing 312.

In an embodiment, the protruding body 432 may protrude from the rear surface (e.g., the surface in the −z direction) of the rotator body 431. For example, with reference to FIG. 4P, the protruding body 432 may protrude from the rear surface (e.g., the surface in the −z direction) of the rotator body 431 on the right side (e.g., the +x direction side) of the rotator body 431. For example, with reference to FIG. 4N, the protruding body 432 may be formed on the side (e.g., the +y direction side) higher than the center of the rotator body 431.

The protruding body 432 may substantially protrude in a cylindrical shape with the hinge axis $H_a$ or $H_b$ as a center. However, this is an example, and the shape and/or location of the protruding body 432 is not limited thereto.

The rail groove 433 may be formed in an arc shape with the hinge axis $H_a$ or $H_b$ as the center and may be recessed in both side surfaces (e.g., the surfaces in the +y and −y directions) of the protruding body 432. A pair of rail grooves 433 may be formed. The rail groove 433 may include a first rail groove 4331 and a second rail groove 4332. For example, the first rail groove 4331 may recess in one side surface (e.g., the surface in the +y direction) of the protruding body 432 and the second rail groove 4332 may recess in the other side surface (e.g., the surface in the −y direction) of the protruding body 432. The rail groove 433 may interoperate with a rotation rail (e.g., the rotation rail 425 of FIG. 4K) of the slider 420. The rotation rail 425 of the slider 420 may be inserted into the rail groove 433. For example, a first rotation rail (e.g., the first rotation rail 4251a of FIG. 4L) of the first slider 420a may be inserted into the first rail groove 4331 of the first rotator 430a and a second rotation rail (e.g., the second rotation rail 4252b of FIG. 4L) of the second slider 420b may be inserted into the second rail groove 4332 of the first rotator 430a. For example, a first rotation rail (e.g., the first rotation rail 4251b of FIG. 4L) of the second slider 420b may be inserted into the first rail groove 4331 of the second rotator 430a and a second rotation rail (e.g., the second rotation rail 4252a of FIG. 4L) of the first slider 420a may be inserted into the second rail groove 4332 of the second rotator 430b. The rotation rail 425 may relatively rotate on the hinge axis $H_a$ or $H_b$ in a designated angle range along the arc shape of the rail groove 433. According to the structure described above, the first and second rotators 430a and 430b may rotate on the hinge axis $H_a$ or $H_b$ relative to the first slider 420a and 420b, respectively, in a designated angle range.

In an embodiment, the rotation cam 434 may interoperate with a reference cam (e.g., the reference cam 426 of FIG. 4K) of the slider 420. The rotation cam 434 may protrude from both side surfaces (e.g., the surfaces in the +y and −y directions) of the protruding body 432. The rotation cam 434 may protrude to include at least one crest and/or one trough structure. The rotation cam 434 may be formed in an arc shape having the hinge axis $H_a$ or $H_b$ as a center. For example, the crest and/or the trough structure of the rotation cam 434 may be substantially formed in the arc shape with the hinge axis $H_a$ or $H_b$ as a center. A pair of rotation cams 434 may be formed. The rotation cam 434 may include a first rotation cam 4341 and a second rotation cam 4342. For example, the first rotation cam 4341 may protrude from one side surface (e.g., the surface in the +y direction) of the protruding body 432 and the second rotation cam 4342 may protrude from the other side surface (e.g., the surface in the −y direction) of the protruding body 432. The rotation cam 434 may be formed on the relatively rear side (e.g., the −z direction side), compared to the rail groove 433. For example, the first rotation cam 4341 may be formed on the relatively rear direction (e.g., the −z direction), compared to the first rail groove 4331, and the second rotation cam 4342 may be formed on the relatively rear direction (e.g., the −z direction), compared to the second rail groove 4332. For example, with the hinge axis $H_a$ or $H_b$ as a center, the rotation cam 434 may be formed in a shape that encloses the rail groove 433 along an arc shape with the hinge axis $H_a$ or $H_b$ as a center from the side outer than the rail groove 433.

In an embodiment, the housing fastening hole 435 for fastening the rotator 430 to a first housing (e.g., the first housing 311 of FIG. 3) or a second housing (e.g., the second housing 312 of FIG. 3) may be formed in the rotator body 431. For example, the housing fastening hole 435 may penetrate the rotator body 431 in the z direction. For example, a fastening member (e.g., a screw, a bolt, a pin, and/or a combination fastening structure) may be inserted into the housing fastening hole 435. A single or a plurality of housing fastening holes 435 may be formed. For example, as illustrated in FIG. 4N, a plurality of housing fastening holes 435 may be formed. However, this is merely an example, and the number, shape, and/or location of the housing fastening hole 435 is not limited thereto.

Referring to FIGS. 4A, 4B, 4C, 4D, and 4L, the elastic member 440 according to an embodiment may be arranged between the hinge bracket 410 and the slider 420. For example, the elastic member 440 may be arranged in the elastic member connection space 415 such that one side of the elastic member 440 is supported by the hinge bracket 410 and the other side of the elastic member 440 is supported by the slider 420. The elastic member 440 may be arranged to generate an elastic force in a direction parallel (e.g., the y direction) with the hinge axis $H_a$ or $H_b$. For example, the elastic member 440 may provide an elastic force in a direction in which a reference cam (e.g., the reference cam 426 of FIG. 4K) and a rotation cam (e.g., the rotation cam 434 of FIG. 4O) press each other. The pressing force of the elastic member 440 may generate a force to maintain a predetermined state of the hinge assembly 400. For example, the elastic member 440 may include a compression spring. However, this is an example, and a type of the elastic member 440 is not limited thereto.

In an embodiment, a single or a plurality of elastic members 440 may be provided. For example, the elastic member 440 may include a first elastic member 440a, a second elastic member 440b, a third elastic member 440c, and a fourth elastic member 440d. The first elastic member 440a may be arranged in the first elastic member connection space 4151 such that one side (e.g., the +y direction side) of the first elastic member 440a is supported by the first elastic member support protrusion 4161 of the hinge bracket 410 as the one side of the first elastic member 440a is inserted into the first elastic member support protrusion 4161 of the hinge bracket 410 and the other side (e.g., the −y direction side) of the first elastic member 440a is supported by the first elastic member support pin 4271a of the first slider 420a as the other side of the first elastic member 440a is inserted into the first elastic member support pin 4271a of the first slider 420a. The second elastic member 440b may be arranged in the second elastic member connection space 4152 such that one side (e.g., the +y direction side) of the second elastic member 440b is supported by the second elastic member support protrusion 4162 of the hinge bracket 410 as the one side of the second elastic member 440b is inserted into the second elastic member support protrusion 4162 of the hinge bracket 410 and the other side (e.g., the −y direction side) of the second elastic member 440b is supported by the second elastic member support pin 4272a of the first slider 420a as the other side of the second elastic member 440b is inserted into the second elastic member support pin 4272a of the first slider 420a. The third elastic member 440c may be arranged in the third elastic member connection space 4153 such that one side (e.g., the −y direction side) of the third elastic member 440c is supported by the third elastic member support protrusion 4163 of the hinge bracket 410 as the one side of the third elastic member 440c is inserted into the third elastic member support protrusion 4163 of the hinge bracket 410 and the other side (e.g., the +y direction side) of the third elastic member 440c is supported by the second elastic member support pin 4272b of the second slider 420b as the other side of the third elastic member 440c is inserted into the second elastic member support pin 4272b of the second slider 420b. The fourth elastic member 440d may be arranged in the fourth elastic member connection space 4154 such that one side (e.g., the −y direction side) of the fourth elastic member 440d is supported by the fourth elastic member support protrusion 4164 of the hinge bracket 410 as the one side of the fourth elastic member 440d is inserted into the fourth elastic member support protrusion 4164 of the hinge bracket 410 and the other side (e.g., the +y direction side) of the fourth elastic member 440d is supported by the first elastic member support pin 4271b of the second slider 420b as the other side of the fourth elastic member 440d is inserted into the first elastic member support pin 4271b of the second slider 420b. In addition, the names of the elastic member support pin 427 and the elastic member support protrusion 416 are used only for distinguishing each component and do not limit the shape of each component. For example, the elastic member support pin 427 may be substantially formed in a protrusion shape or the elastic member support protrusion 416 may be substantially formed in a pin shape.

Figure 4Q:
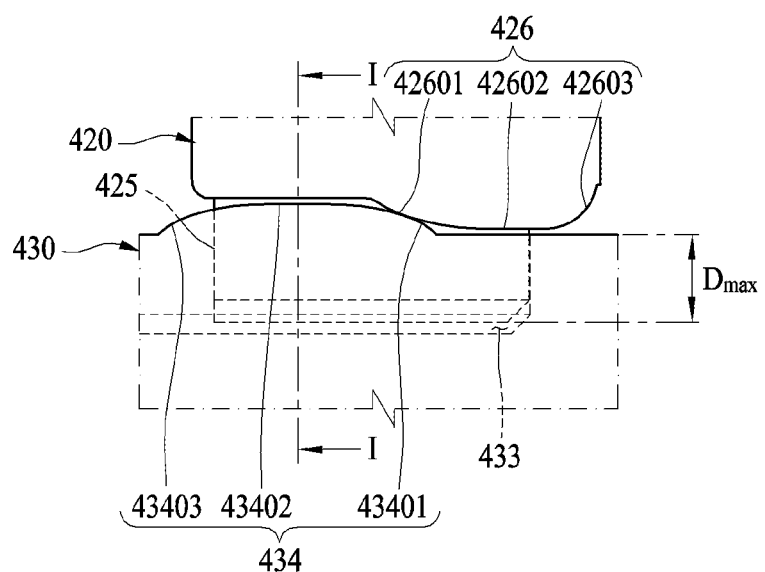
FIG. 4Q is view illustrating an interoperation state of an example rotation cam and an example reference cam when an example hinge assembly is in an unfolded state, according to various embodiments.

FIG. 4Q is view illustrating an interoperation state of an example rotation cam and an example reference cam when an example hinge assembly is in an unfolded state, according to various embodiments.

Hereinafter, with reference to FIGS. 4A, 4B, 4C, and 4Q, a description of interoperation of the rotation cam 434 with the reference cam 426 is described when the hinge assembly 400 is in an unfolded state according to an embodiment. The unfolded state of the hinge assembly 400 may, for example, refer to a state in which the pair of rotators (the first and second rotators 430a and 430b) is fully unfolded with respect to the hinge bracket 410. For example, the unfolded state of the hinge assembly 400 may, for example, refer to a state in which the pair of rotators (the first and second rotators 430a and 430b) is maximally unfolded in a direction in which the rotators 430a and 430b move away from each other with respect to the hinge bracket 410. When the hinge assembly 400 is in the unfolded state, the pair of rotators (the first and second rotators 430a and 430b) may be arranged to be oriented in substantially the same direction (e.g., the +z direction). For ease of description, the description is provided based on a first rotation cam (e.g., the first rotation cam 4341 of FIG. 4N) of the first rotator 430a and a first reference cam (e.g., the first reference cam 4261a of FIG. 4L) of the first slider 420a.

In an embodiment, the reference cam 426 may include a first surface 42601, a second surface 42602, and a third surface 42603. For example, the first surface 42601, the second surface 42602, and the third surface 42603 may include a protruding crest structure. For example, the first surface 42601 may be inclinedly formed relative to the hinge axis $H_a$ in one direction, the second surface 42602 may be formed to be substantially perpendicular to the hinge axis $H_a$, and the third surface 42603 may be inclinedly formed relative to the hinge axis $H_a$ in the other direction. The first surface 42601, the second surface 42602, and the third surface 42603 may be substantially and continuously formed.

In an embodiment, the rotation cam 434 may include a fourth surface 43401, a fifth surface 43402, and a sixth surface 43403. For example, the fourth surface 43401, the fifth surface 43402, and the sixth surface 43403 may include a protruding crest structure. For example, the fourth surface 43401 may be inclinedly formed relative to the hinge axis $H_a$ in one direction, the fifth surface 43402 may be formed to be substantially perpendicular to the hinge axis $H_a$, and the sixth surface 43403 may be inclinedly formed relative to the hinge axis $H_a$ in the other direction. The fourth surface 43401, the fifth surface 43402, and the sixth surface 43403 may be substantially and continuously formed.

In an embodiment, when the hinge assembly 400 is in the unfolded state, the reference cam 426 may be alternately engaged with the rotation cam 434. For example, a crest of the reference cam 426 and a crest of the rotation cam 434 may be engaged with each other. For example, the first surface 42601 of the reference cam 426 may contact the fourth surface 43401 of the rotation cam 434. The first surface 42601 of the reference cam 426 and the fourth surface 43401 of the rotation cam 434 may closely contact each other by pressing each other by the elastic force of the elastic member 440. The elastic force of the elastic member 440 may generate a reaction force (e.g., a normal force) between the first surface 42601 and the fourth surface 43401. Since the first surface 42601 and the fourth surface 43401 are inclinedly formed relative to the hinge axis $H_a$, the reaction force between the first surface 42601 and the fourth surface 43401 may have a force component in a direction (e.g., the x direction) perpendicular to the hinge axis $H_a$. Of the reaction force applied to the fourth surface 43401, the force component in a direction (e.g., the +x direction) perpendicular to the hinge axis $H_a$ may generate a torque in a direction in which the rotator 430 unfolds with the hinge axis $H_a$ as a center. The torque may function as open detent to maintain the hinge assembly 400 to be in the unfolded state. Accordingly, the rotator 430 may begin rotating in a direction in which the rotator 430 folds only when a force and/or a torque greater than the open detent is applied to the rotator 430 from the outside. In addition, in a process in which the hinge assembly 400 is fully unfolded from the intermediate state, the reaction force between the first surface 42601 and the fourth surface 43401 may function as a force to push the hinge assembly 400 in a partially unfolded state to be in the fully unfolded state. For example, the reaction force between the first surface 42601 and the fourth surface 43401 may function as a pressing force to automatically and fully unfold the hinge assembly 400 when the hinge assembly 400 is in a designated angle range close to the fully unfolded state.

Figure 4R:
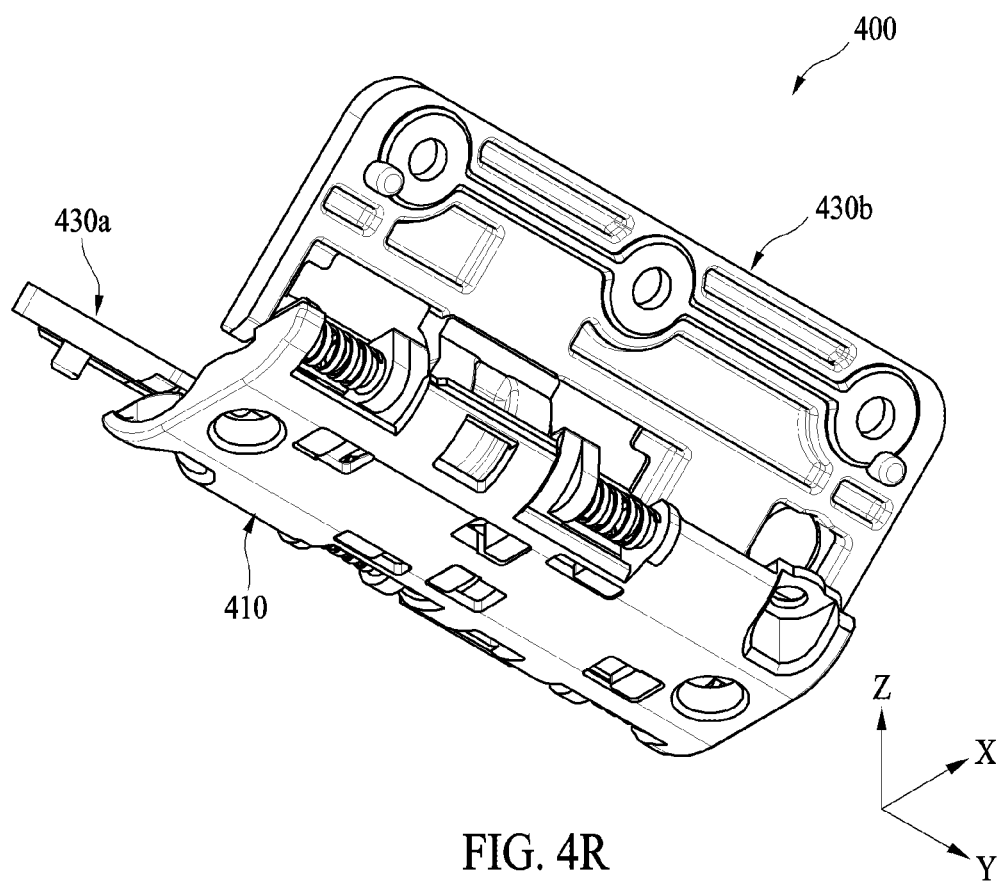
FIG. 4R is a rear perspective view illustrating an intermediate state of an example hinge assembly, according to various embodiments.
Figure 4S:
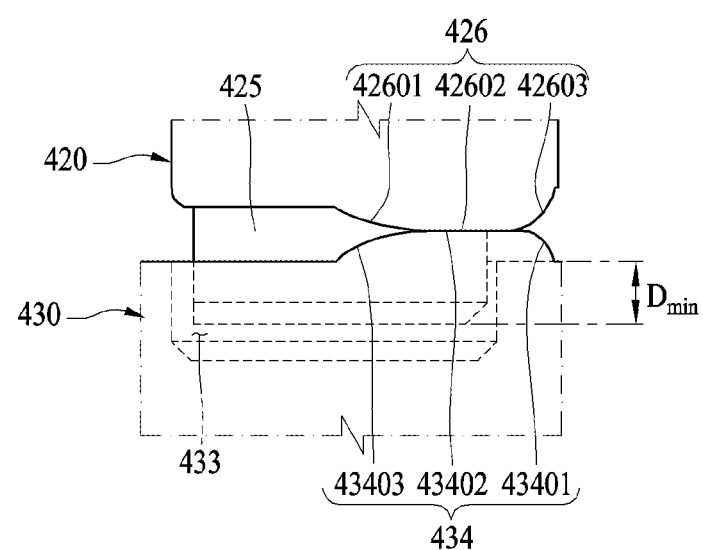
FIG. 4S is view illustrating an interoperation state of an example rotation cam and an example reference cam when an example hinge assembly is in an intermediate state, according to various embodiments.

FIG. 4R is a rear perspective view illustrating an intermediate state of an example hinge assembly, according to various embodiments. FIG. 4S is view illustrating an interoperation state of an example rotation cam and an example reference cam when an example hinge assembly is in an intermediate state, according to various embodiments.

Hereinafter, with reference to FIGS. 4R and 4S, a description of interoperation of the rotation cam 434 with the reference cam 426 is described when the hinge assembly 400 is in an intermediate state according to an embodiment. The intermediate state of the hinge assembly 400 may refer, for example, to a state between the fully unfolded state and the fully folded state. For example, the intermediate state of the hinge assembly 400 may be a state in which the pair of rotators (the first and second rotators 430a and 430b) folds in a designated angle with respect to the hinge bracket 410 in a direction in which the pair of rotators (the first and second rotators 430a and 430b) approach each other from the fully unfolded state and/or a state in which the pair of rotators (the first and second rotators 430a and 430b) unfolds in a designated angle with respect to the hinge bracket 410 in a direction moving away from each other from the fully folded state. When the hinge assembly 400 is in the intermediate state, the pair of rotators (the first and second rotators 430a and 430b) may be substantially arranged in a diagonal direction to each other. For ease of description, the description is provided based on a first rotation cam (e.g., the first rotation cam 4341 of FIG. 4N) of the first rotator 430a and a first reference cam (e.g., the first reference cam 4261a of FIG. 4L) of the first slider 420a.

In an embodiment, while the hinge assembly 400 changes from the unfolded state to the intermediate state, the rotation cam 434 may slide over the reference cam 426 as the rotator 430 rotates. For example, when the hinge assembly 400 is in the intermediate state, the reference cam 426 and the rotation cam 434 may be frontally engaged with each other. For example, the reference cam 426 and the rotation cam 434 may be arranged such that the crest of the reference cam 426 and the crest of the rotation cam 434 frontally engage with each other. In the process in which the crest of the reference cam 426 and the crest of the rotation cam 434 frontally engage with each other, the slider 420 may slide relative to the hinge bracket 410 by a designated distance (e.g., the height of the crest structure of the reference cam 426 and/or the rotation cam 434) in the hinge axis $H_a$ direction (e.g., the y direction). For example, while the hinge assembly 400 changes from the unfolded state to the intermediate state, a first slider (e.g., the first slider 420a of FIG. 4D) may slide in the +y direction and a second slider (e.g., the second slider 420b of FIG. 4D) may slide in the −y direction. The elastic member 440 may be compressed by a distance in which the slider 420 slides, and the magnitude of the elastic force generated by the elastic member 440 may increase.

In an embodiment, when the hinge assembly 400 is in the intermediate state, the second surface 42602 of the reference cam 426 may contact the fifth surface 43402 of the rotation cam 434. The second surface 42602 of the reference cam 426 and the fifth surface 43402 of the rotation cam 434 may closely contact each other by pressing each other by the elastic force of the elastic member 440. The elastic force of the elastic member 440 may generate a reaction force (e.g., a normal force) between the second surface 42602 and the fifth surface 43402. Since the second surface 42602 and the fifth surface 43402 are formed substantially perpendicular to the hinge axis $H_a$, the reaction force between the second surface 42602 and the fifth surface 43402 may be substantially formed in the hinge axis $H_a$ direction (e.g., the y direction). The reaction force between the second surface 42602 and the fifth surface 43402 may generate a frictional force between the second surface 42602 and the fifth surface 43402. The frictional force may function as a free stop force to maintain the hinge assembly 400 to be in the intermediate state. Accordingly, the rotator 430 may begin rotating in a direction in which the rotator 430 folds or unfolds only when a force and/or a torque greater than the free stop force is applied to the rotator 430 from the outside.

Figure 4T:
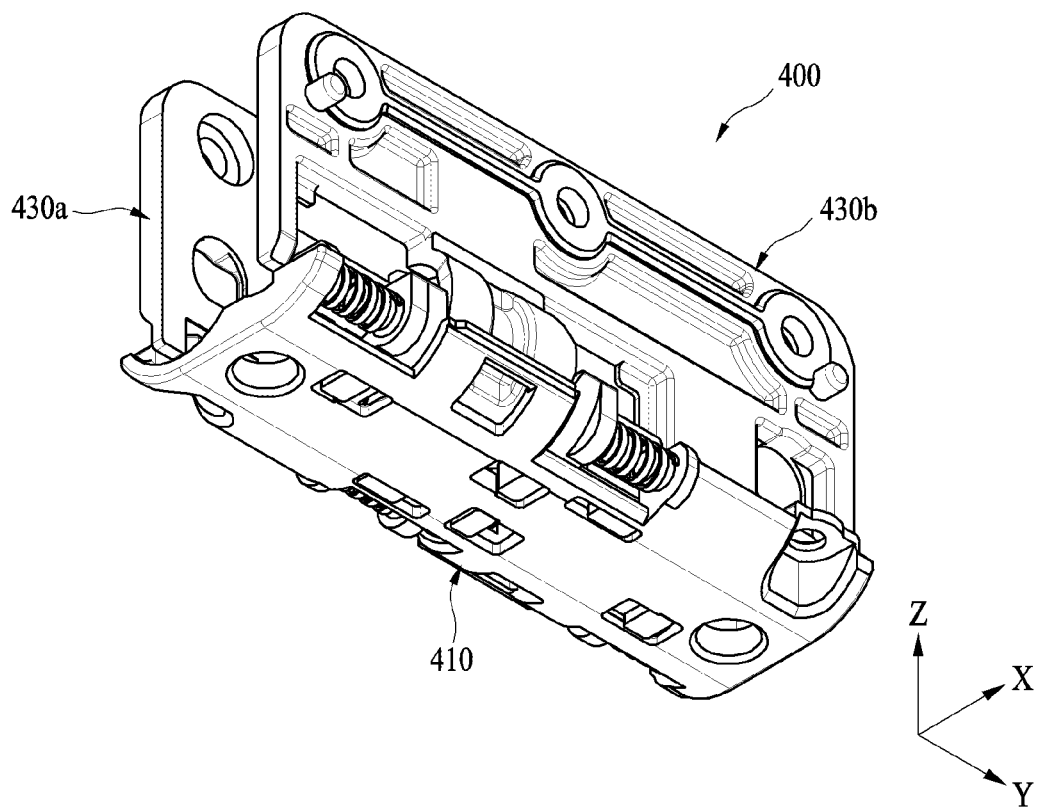
FIG. 4T is a rear perspective view illustrating a folded state of an example hinge assembly according to various embodiments.
Figure 4U:
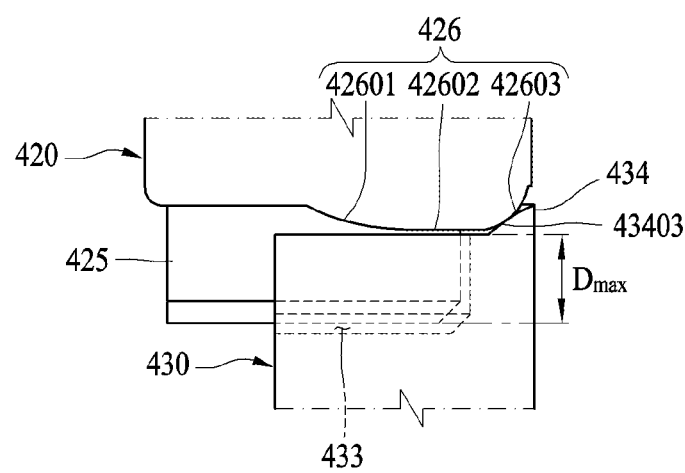
FIG. 4U is view illustrating an interoperation state of an example rotation cam and an example reference cam when an example hinge assembly is in a folded state, according to various embodiments.

FIG. 4T is a rear perspective view illustrating a folded state of an example hinge assembly according to various embodiments. FIG. 4U is view illustrating an interoperation state of an example rotation cam and an example reference cam when an example hinge assembly is in a folded state, according to various embodiments.

Hereinafter, with reference to FIGS. 4T and 4U, a description of interoperation of the rotation cam 434 with the reference cam 426 is described when the hinge assembly 400 is in a folded state according to an embodiment. The folded state of the hinge assembly 400 may refer, for example, to a state in which the pair of rotators (the first and second rotators 430a and 430b) is fully folded with respect to the hinge bracket 410. For example, the folded state of the hinge assembly 400 may refer, for example, to a state in which the pair of rotators (the first and second rotators 430a and 430b) is maximally folded in a direction approaching each other with respect to the hinge bracket 410. When the hinge assembly 400 is in the folded state, the pair of rotators (the first and second rotators 430a and 430b) may be arranged to substantially face each other. For ease of description, the description is provided based on a first rotation cam (e.g., the first rotation cam 4341 of FIG. 4N) of the first rotator 430a and a first reference cam (e.g., the first reference cam 4261a of FIG. 4L) of the first slider 420a.

In an embodiment, while the hinge assembly 400 changes from the intermediate state to the folded state, the rotation cam 434 may slide down the reference cam 426 as the rotator 430 rotates. For example, when the hinge assembly 400 is in the folded state, the reference cam 426 and the rotation cam 434 may be alternately engaged with each other. For example, a crest of the reference cam 426 and a crest of the rotation cam 434 may be engaged with each other. In this process, the slider 420 may return to its original position (e.g., a position substantially the same as the unfolded state) by sliding relative to the hinge bracket 410 by a designated distance (e.g., the height of the crest structure of the reference cam 426 and/or the rotation cam 434) in the hinge axis $H_a$ direction (e.g., the y direction). For example, while the hinge assembly 400 changes from the intermediate state to the folded state, a first slider (e.g., the first slider 420a of FIG. 4D) and a second slider (e.g., the second slider 420b of FIG. 4D) may return to its original position (e.g., the position substantially the same as the unfolded state) as the first slider may slide in the −y direction and the second slider may slide in the +y direction.

In an embodiment, when the hinge assembly 400 is in the folded state, the third surface 42603 of the reference cam 426 may contact the sixth surface 43403 of the rotation cam 434. The third surface 42603 of the reference cam 426 and the sixth surface 43403 of the rotation cam 434 may closely contact each other by pressing each other by the elastic force of the elastic member 440. The elastic force of the elastic member 440 may generate a reaction force (e.g., a normal force) between the third surface 42603 and the sixth surface 43403. Since the third surface 42603 and the sixth surface 43403 are inclinedly formed relative to the hinge axis $H_a$, the reaction force between the third surface 42603 and the sixth surface 43403 may have a force component in a direction (e.g., the x direction) perpendicular to the hinge axis $H_a$. Of the reaction force applied to the sixth surface 43403, the force component in a direction (e.g., the −x direction) perpendicular to the hinge axis $H_a$ may generate a torque in a direction in which the rotator 430 folds with the hinge axis $H_a$ as a center. The torque may function as close detent to maintain the hinge assembly 400 to be in the folded state. Accordingly, the rotator 430 may begin rotating in a direction in which the rotator 430 unfolds only when a force and/or a torque greater than the close detent is applied to the rotator 430 from the outside. In addition, in a process in which the hinge assembly 400 is fully folded from the intermediate state, the reaction force between the third surface 42603 and the sixth surface 43403 may function as a force to push the hinge assembly 400 in a partially folded state to be in the fully folded state. For example, the reaction force between the third surface 42603 and the sixth surface 43403 may function as a pressing force to automatically and fully fold the hinge assembly 400 when the hinge assembly 400 is in a designated angle range close to the fully folded state.

In addition, to describe interoperation of the rotation cam 434 with the reference cam 426 with reference to FIGS. 4A, 4B, and 4C and 4Q, 4R, 4S, 4T, and 4U, the description is provided based on a first rotation cam (e.g., the first rotation cam 4341 of FIG. 4N) of the first rotator 430a and a first reference cam (e.g., the first reference cam 4261a of FIG. 4L) of the first slider 420a, for ease of description. A second rotation cam (e.g., the second rotation cam 4342 of FIG. 4N) of the first rotator 430a may interoperate with a second reference cam (e.g., the second reference cam 4262b of FIG. 4L) of the second slider 420b in substantially the same manner as the above description. In addition, one of ordinary skill in the art may clearly understand that the second rotator 430b may operate in substantially the same manner as the first rotator 430a.

As described above with reference to FIGS. 4A to 4U, the hinge assembly 400 according to an embodiment may implement the open detent, the free stop force, and/or the close detent through interoperation of the rotation cam 434 with the reference cam 426. In the hinge assembly 400 according to an embodiment, since the rotation rail 425, the reference cam 426, and/or the elastic member support pin 427 are formed in the slider 420, a component for implementing rotation, a component for implementing cam interoperation, and/or a component for supporting an elastic member may be substantially integrated into one component. Accordingly, the number of components of the hinge assembly 400 may decrease.

In an embodiment, the rotation rail 425 and the reference cam 426 may be formed with the same hinge axis $H_a$ or $H_b$ as a center. In addition, the rail groove 433 and the rotation cam 434 may be formed with the same hinge axis $H_a$ or $H_b$ as a center. Accordingly, since the hinge axis $H_a$ or $H_b$, which is a center of rotation of the rotator 430, coincides with an operating axis of a cam structure (e.g., the reference cam 426 and the rotation cam 434), loss of a driving force may not occur in a process of transmitting the rotational power applied to the rotator 430 to the cam structure (e.g., the reference cam 426 and the rotation cam 434).

In an embodiment, since the rotation cam 434 is arranged on the relatively rear side (e.g., the −z direction side), compared to the rail groove 433, the radius from the hinge axis $H_a$ or $H_b$ to the rotation cam 434 may be greater than the radius from the hinge axis $H_a$ or $H_b$ to the rail groove 433. Therefore, in the hinge assembly 400 according to an embodiment, since the radius from the hinge axis $H_a$ or $H_b$ to the rotation cam 434 may be formed to be relatively large, the reaction force applied to the rotation cam 434 may generate a relatively large torque. For example, the magnitude of the open detent and/or close detent generated by the cam structure (e.g., the reference cam 426 and the rotation cam 434) may increase.

In the hinge assembly 400 according to an embodiment, the size of a contact area between the second surface 42602 and the fifth surface 43402 may increase by increasing the lengths of the arcs of the second surface 42602 and the fifth surface 43402 with the hinge axis $H_a$ or $H_b$ as a center. When the size of the contact area between the second surface 42602 and the fifth surface 43402 increases, the frictional force between the second surface 42602 and the fifth surface 43402 may increase, and for example, the magnitude of the free stop force generated by the cam structure (e.g., the reference cam 426 and the rotation cam 434) may increase.

As described above, in the hinge assembly 400 according to an embodiment, the number of components may decrease, loss of a driving force in a process of transmitting the rotational power applied to the rotator 430 to the cam structure (e.g., the reference cam 426 and the rotation cam 434) may not substantially occur, and the open detent, the free stop force, and/or the close detent generated by the cam structure (e.g., the reference cam 426 and the rotation cam 434) may increase, and thus, the hinge assembly 400 may be miniaturized.

In the hinge assembly 400 according to an embodiment, an operation of the first rotator 430a may be synchronized with an operation of the second rotator 430b through the first slider 420a and the second slider 420b. Since the first main body 4211 and the second main body 4212 of the first and second sliders 420a and 420b are connected to each other through the bridge body 422, the operation of the first rotator 430a may be synchronized with the operation of the second rotator 430b through the first and second sliders 420a and 420b. For example, when the first rotator 430a starts to rotate relatively earlier than the second rotator 430b, the first slider 420a and the second slider 420b may slide in the first hinge axis $H_a$ direction (e.g., the y direction) through interoperation of the cam structure (e.g., the reference cam 426 and the rotation cam 434). As the first slider 420a and the second slider 420b slide, the cam structures (e.g., the reference cam 426 and the rotation cam 434) of the second rotator 430b may substantially press each other or may be spaced apart from each other. As the cam structures (e.g., the reference cam 426 and the rotation cam 434) of the second rotator 430b press each other or are spaced apart from each other, the second rotator 430b may rotate relative to the hinge bracket 410. For example, through sliding of the first slider 420a and the second slider 420b, the second rotator 430b may be synchronized with the first slider 420a and may rotate by a degree of rotation of the first slider 420a.

Referring to FIGS. 4Q, 4S, and 4U, in a hinge assembly (e.g., the hinge assembly 400 of FIG. 4A) according to an embodiment, since the rotation rail 425 and the reference cam 426 are formed in the slider 420, the degree of fastening between the rotation rail 425 and the rail groove 433 may change as interoperation of the reference cam 426 with the rotation cam 434. For example, when the hinge assembly 400 is in the unfolded state or the folded state, the reference cam 426 and the rotation cam 434 may be alternately engaged with each other, and thus, the rotation rail 425 may be fastened in the rail groove 433 in a maximum depth $D_{max}$. On the other hand, when the hinge assembly 400 is in the intermediate state, the reference cam 426 and the rotation cam 434 may be frontally engaged with each other, and thus, the rotation rail 425 may be fastened in the rail groove 433 in a minimum depth $D_{min}$ as the slider 420 slides. Therefore, for stable driving, when the hinge assembly 400 is in the intermediate state, the rotation rail 425 and the rail groove 433 may be configured to fasten to each other by at least 0.5 millimeters (mm). However, this is merely an example, and the minimum fastening amount of the rotation rail 425 and the rail groove 433 is not limited thereto.

Figure 4V:
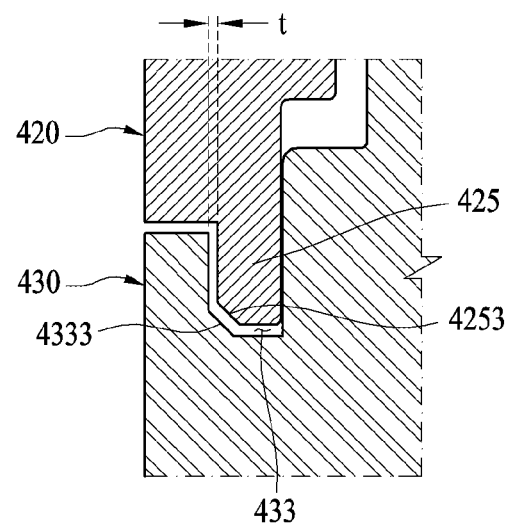
FIG. 4V is a cross-sectional view taken along line I-I of FIG. 4Q.

FIG. 4V is a cross-sectional view taken along line I-I of FIG. 4Q.

Referring to FIG. 4V, in an embodiment, a gap of a predetermined size may be provided between the rotation rail 425 and the rail groove 433 for a relative rotational operation of the rotation rail 425 and the rail groove 433. However, to minimize operation sound caused by the gap between the rotation rail 425 and the rail groove 433, a width difference t between the rotation rail 425 and the rail groove 433 may be formed to be less than or equal to 0.03 mm. However, this is merely an example, and the width difference between the rotation rail 425 and the rail groove 433 is not limited thereto.

In an embodiment, a chamfer for fastening stability between the rotation rail 425 and the rail groove 433 may be formed on edges of the rotation rail 425 and the rail groove 433. For example, the edge of the rail groove 433 may be formed of an inclined surface 4333 and the edge of the rotation rail 425 corresponding to the edge of the rail groove 433 may be formed of an inclined surface 4253. According to the shape described above, when an electronic device (e.g., the electronic device 300 of FIG. 3) falls and receives an impact, the fastening stability between the rotation rail 425 and the rail groove 433 may be maintained.

Figure 4W:
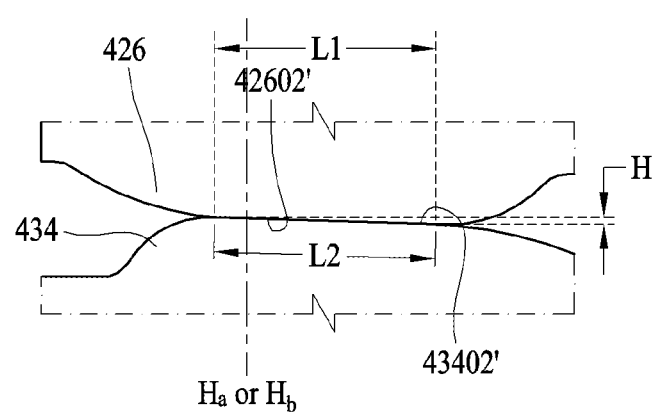
FIG. 4W is view illustrating an interoperation state of an example reference cam and an example rotation cam when an example hinge assembly is in an intermediate state, according to various embodiments.

FIG. 4W is view illustrating an interoperation state of an example reference cam and an example rotation cam when an example hinge assembly is in an intermediate state, according to various embodiments.

In an embodiment, a second surface 42602' and a fifth surface 43402' may be inclinedly formed by a predetermined angle with respect to the hinge axis $H_a$ or $H_b$. For example, the second surface 42602' and the fifth surface 43402' may be inclinedly formed by three to five degrees with respect to the hinge axis $H_a$ or $H_b$. However, this is merely an example, and the inclination angles of the second surface 42602' and the fifth surface 43402' are not limited thereto. As the second surface 42602' and the fifth surface 43402' are inclinedly formed with respect to the hinge axis $H_a$ or $H_b$, the length in which an elastic member (e.g., the elastic member 440 of FIG. 4D) is compressed in the intermediate state may increase. For example, in comparison with a case in which the second surface 42602' and the fifth surface 43402' are formed to be perpendicular to the hinge axis $H_a$ or $H_b$, when the second surface 42602' and the fifth surface 43402' are inclinedly formed with respect to the hinge axis $H_a$ or $H_b$, the elastic member 440 may be further compressed by H of FIG. 4W. According to the structure described above, since the length in which the elastic member 440 is compressed increases by H, the magnitude of the elastic force generated by the elastic member 440 may increase. Accordingly, a reaction force (e.g., a normal force) generated between the second surface 42602' and the fifth surface 43402' may increase. In addition, as the second surface 42602' and the fifth surface 43402' are inclinedly formed with respect to the hinge axis $H_a$ or $H_b$, the size of a contact area between the second surface 42602' and the fifth surface 43402' may increase. For example, compared to a contact length L1 of a case in which the second surface 42602' and the fifth surface 43402' are formed to be perpendicular to the hinge axis $H_a$ or $H_b$, a contact length L2 may be greater in case the second surface 42602' and the fifth surface 43402' are inclinedly formed with respect to the hinge axis $H_a$ or $H_b$. Accordingly, the size of the contact area between the second surface 42602' and the fifth surface 43402' may increase, and thus, the magnitude of a frictional force generated between the second surface 42602' and the fifth surface 43402' may increase. For example, as the second surface 42602' and the fifth surface 43402' are inclinedly formed with respect to the hinge axis $H_a$ or $H_b$, the reaction force and/or the size of the contact area between the second surface 42602' and the fifth surface 43402' may increase. Accordingly, the frictional force between the second surface 42602' and the fifth surface 43402' may further increase and the free stop force to maintain the hinge assembly (e.g., the hinge assembly 400 of FIG. 4A) to be in the intermediate state may further increase. For example, the frictional force between the second surface 42602' and the fifth surface 43402' may provide a resistive force against a restoring force in which a display (e.g., the display 250 of FIG. 2A) attempts to unfold itself. For example, the frictional force between the second surface 42602' and the fifth surface 43402' may provide a free stop force to maintain an electronic device (e.g., the electronic device 200 of FIG. 2A) to be in a predetermined state (e.g., the intermediate state).

Figure 5:
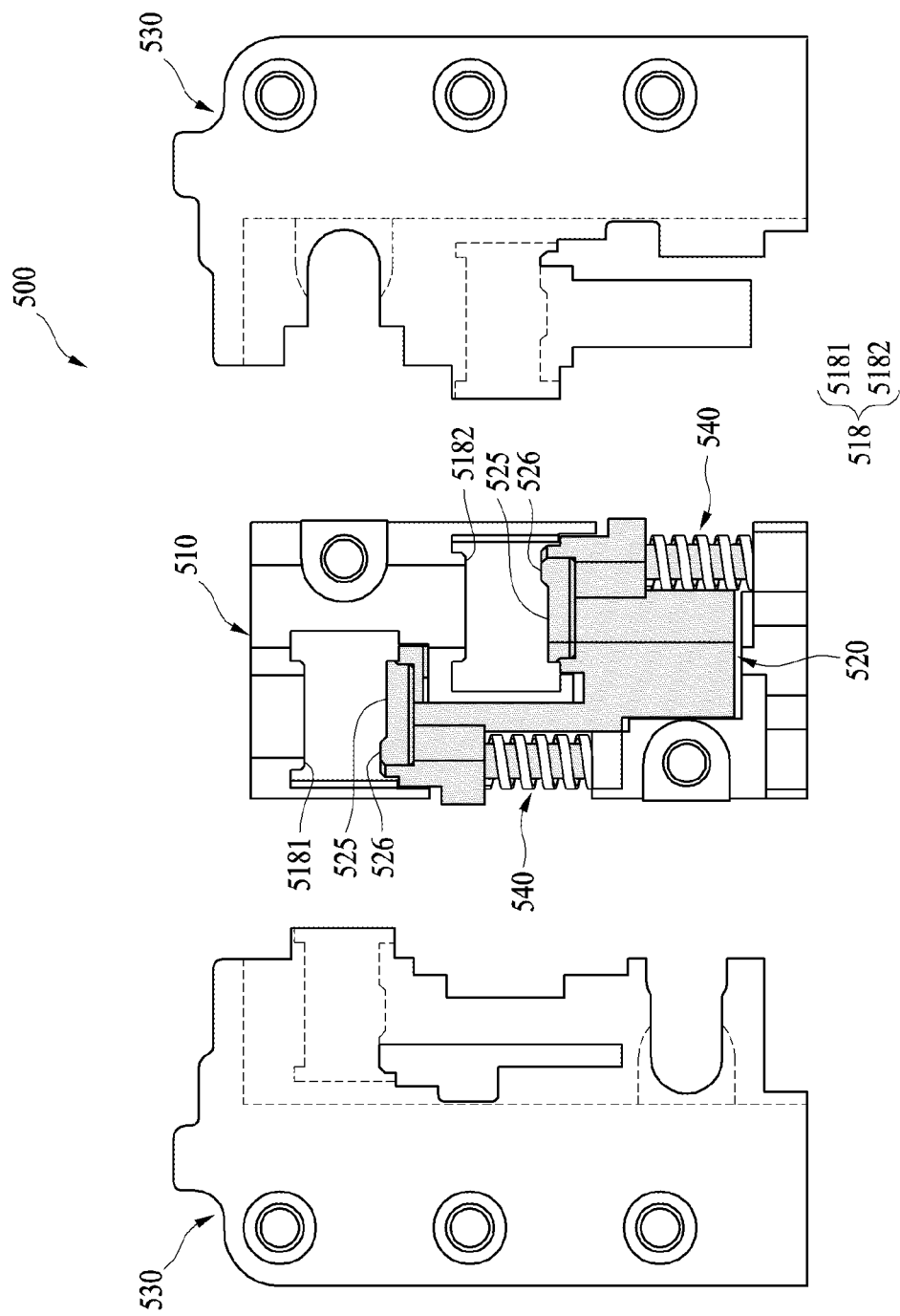
FIG. 5 is a partially exploded plan view illustrating an example hinge assembly according to various embodiments.

FIG. 5 is a partially exploded plan view illustrating an example hinge assembly according to various embodiments.

Referring to FIG. 5, a hinge assembly 500 according to an embodiment may include a hinge bracket 510, a slider 520, a rotator 530, and an elastic member 540. The hinge assembly 500 may include one slider 520 and two elastic members 540. The slider 520 and the elastic member 540 may be substantially the same as the second slider 420b and the elastic member 440 described with reference to FIGS. 4A to 4W. To avoid excessive repetition, the description of the second slider 420b and the elastic member 440 may be applied to a detailed description of the slider 520 and the elastic member 540.

In an embodiment, the hinge bracket 510 may include a bracket rotation rail 518. The bracket rotation rail 518 may be configured to substantially replace the rotation rail 425 of the first slider 420a described with reference to FIGS. 4A to 4W. For example, the bracket rotation rail 518 may substantially correspond to the rotation rail 425 of the first slider 420a.

In an embodiment, the bracket rotation rail 518 may be formed in a direction facing the rotation rail 525 (e.g., the first and second rotation rails 4251b and 4252b of the second slider 420b of FIG. 4L) of the slider 520. For example, the bracket rotation rail 518 may include a first bracket rotation rail 5181 and a second bracket rotation rail 5182. The first bracket rotation rail 5181 and the second bracket rotation rail 5182 may be substantially formed at a location and/or in a shape corresponding to the first rotation rail 4251a and the second rotation rail 4252a of the first slider 420a, respectively.

In an embodiment, the rotator 530 may include a first rail groove (e.g., the first rail groove 4331 of FIG. 4N) engaged with the bracket rotation rail 518, a second rail groove (e.g., the second rail groove 4332 of FIG. 4N) engaged with the rotation rail 525 of the slider 520, and a rotation cam (e.g., the second rotation cam 4342 of FIG. 4O) interoperating with a reference cam 526 (e.g., the first and second reference cams 4261b and 4262b of the second slider 420b of FIG. 4L) of the slider 520.

In an embodiment, according to the structure described above, the hinge assembly 500 may operate in substantially the same manner as the hinge assembly 400 described with reference to FIGS. 4A to 4W, while the hinge assembly 500 includes one slider 520. Compared to the hinge assembly 400, the hinge assembly 500 may have relatively less components and may be formed to be relatively smaller.

Moreover, in an embodiment, the hinge bracket 510 may further include a bracket reference cam (not shown) to substantially replace the reference cam (e.g., the first and second reference cams 4261a and 4262a of the first slider 420a of FIG. 4L) of the first slider 420a described with reference to FIGS. 4A to 4W, and the rotator 530 may further include a rotation cam (e.g., the first rotation cam 4341 of FIG. 4O) interoperating with the bracket reference cam.

In an embodiment, the electronic device 300 may include the display 250 including the first area 251, the second area 252, and the folding area 253 between the first area 251 and the second area 252, the first housing 311 configured to support the first area 251, the second housing 312 configured to support the second area 252, and the hinge assembly 400 configured to connect the first housing 311 to the second housing 312 and operate between a folded state in which the first area 251 and the second area 252 face each other and an unfolded state in which the first area 251 and the second area 252 do not face each other, wherein the hinge assembly 400 may include the hinge bracket 410, the slider 420 slidably connected to the hinge bracket 410 and including the pair of reference cams 426 and a pair of rotation rails 425 configured to define the pair of hinge axes $H_a$ and $H_b$, the pair of rotators 430 rotatably connected to the slider 420 with the pair of hinge axes $H_a$ and $H_b$ as centers, respectively, and both including the rotation cam 434 configured to interoperate with the reference cams 426, and the elastic member 440 configured to provide an elastic force in a direction in which the reference cam 426 and the rotation cam 434 press each other.

In an embodiment, the slider 420 may further include the pair of main bodies 421 in which each of the rotation rails 425 and each of the reference cams 426 are provided, and the bridge body 422 configured to connect the pair of main bodies 421 to each other.

In an embodiment, the slider 420 may further include the elastic member support pin 427 protruding from the main body 421 and configured to support one side of the elastic member 440 as the one side of the elastic member 440 is inserted into the elastic member support pin 427.

In an embodiment, the rotation rail 425 and the reference cam 426 may be provided on one side of the main body 421, and the elastic member support pin 427 may be provided on the other side of the main body 421.

In an embodiment, the hinge bracket 410 may include the elastic member support protrusion 416 protruding in a direction facing the elastic member support pin 427 and configured to support the other side of the elastic member 440 as the other side of the elastic member 440 is inserted into the elastic member support protrusion 416.

In an embodiment, the hinge bracket 410 may include the pair of sliding rails 413 provided in a direction parallel with the hinge axis $H_a$ or $H_b$, and the slider 420 may further include the pair of sliding protrusions 423 slidably connected to the pair of sliding rails along the pair of sliding rails 413, respectively.

In an embodiment, the hinge bracket 410 may further include the pair of sliding guide rails 414 provided in a direction parallel with the hinge axis $H_a$ or $H_b$, and the slider 420 may further include the sliding guide protrusion 424 configured to guide a sliding path of the slider 420 by being inserted into the pair of sliding guide rails 424.

In an embodiment, the pair of sliders 420 may be provided, and the pair of sliders 420 may be arranged such that the rotation rail 425 and the reference cam 426 are arranged in a direction facing each other and spaced apart from each other.

In an embodiment, one slider 520 may be provided, and the hinge bracket 510 may include the pair of bracket rotation rails 518 provided in a direction facing the pair of rotation rails 425 of the slider 520.

In an embodiment, the rotation cam 434 may be formed in an arc shape with the hinge axis $H_a$ or $H_b$ as a center.

In an embodiment, while the rotator 430 rotates on the hinge axis $H_a$ or $H_b$, the slider 420 may slide relative to the hinge bracket 410 in a direction of the hinge axis $H_a$ or $H_b$ by interoperation between the reference cam 426 and the rotation cam 434.

In an embodiment, the reference cam 426 may include the first surface 42601, the second surface 42602, and the third surface 42603, the rotation cam 434 may include the fourth surface 43401, the fifth surface 43402, and the sixth surface 43403, in the unfolded state, the first surface 42601 may contact the fourth surface 43401, in the folded state, the third surface 42603 may contact the sixth surface 43403, in an intermediate state between the unfolded state and the folded state, the second surface 42602 may contact the fifth surface 43402, and the second surface 42602' and the fifth surface 43402' may be inclined to the hinge axis.

In an embodiment, the rotator 430 may further include the rail groove 433 that interoperates with the rotation rail 425.

In an embodiment, in an intermediate state between the unfolded state and the folded state, the rotation rail 425 may be fastened in the rail groove 433 by at least 0.5 millimeters.

In an embodiment, a difference between the width of the rotation rail 425 and the width of the rail groove 433 may be less than or equal to 0.03 millimeters.

In an embodiment, the hinge assembly 400 applied to the foldable electronic device 300 may include the hinge bracket 410, the slider 420 slidably connected to the hinge bracket 410 and including the pair of reference cams 426 and the pair of rotation rails 425 configured to define the pair of hinge axes $H_a$ and $H_b$, the pair of rotators 430 rotatably connected to the slider 420 with the pair of hinge axes $H_a$ and $H_b$ as centers, respectively, and both including the rotation cam 434 configured to interoperate with the reference cams 426, and the elastic member 440 configured to provide an elastic force in a direction in which the reference cam 426 and the rotation cam 434 press each other.

In an embodiment, the slider 420 may further include the pair of main bodies 421 in which each of the rotation rails 425 and each of the reference cams 426 are provided, the bridge body 422 connecting the pair of main bodies 421 to each other, and the elastic member support pin 427 protruding from the main body 421 and configured to support one side of the elastic member 440 as the one side of the elastic member 440 is inserted into the elastic member support pin 427.

In an embodiment, the hinge bracket 410 may include the pair of sliding rails 413 provided in a direction parallel with the hinge axis $H_a$ or $H_b$, and the slider 420 may further include the pair of sliding protrusions 423 slidably connected to the pair of sliding rails along the pair of sliding rails 413, respectively.

In an embodiment, the rotation cam 434 may be formed in an arc shape with the hinge axis $H_a$ or $H_b$ as a center.

In an embodiment, the electronic device 300 may include the display 250 including the first area 251, the second area 252, and the folding area 253 between the first area 251 and the second area 252, the first housing 311 configured to support the first area 251, the second housing 312 configured to support the second area 252, and the hinge assembly 400 configured to connect the first housing 311 to the second housing 312 and operate between a folded state in which the first area 251 and the second area 252 face each other and an unfolded state in which the first area 251 and the second area 252 do not face each other, wherein the hinge assembly 400 may include the hinge bracket 410, the slider 420 slidably connected to the hinge bracket 410 and including the pair of reference cams 426 and a pair of rotation rails 425 configured to define the pair of hinge axes $H_a$ and $H_b$, the pair of rotators 430 rotatably connected to the slider 420 with the pair of hinge axes $H_a$ and $H_b$ as centers, respectively, and both including the rotation cam 434 configured to interoperate with the reference cams 426, and the elastic member 440 configured to provide an elastic force in a direction in which the reference cam 426 and the rotation cam 434 press each other, wherein the slider 420 may further include the pair of main bodies 421 in which each of the rotation rails 425 and each of the reference cam 426 are provided, the bridge body 422 connecting the pair of main bodies 421 to each other, and the elastic member support pin 427 protruding from the main body 421 and configured to support one side of the elastic member 440 as the one side of the elastic member 440 is inserted into the elastic member support pin 427, wherein the hinge bracket 410 may include the pair of sliding rails 413 provided in a direction parallel with the hinge axis $H_a$ or $H_b$, the slider 420 may further include the pair of sliding protrusions 423 slidably connected to the pair of sliding rails along the pair of sliding rails 413, respectively, and the rotation cam 434 may be formed in an arc shape with the hinge axis $H_a$ or $H_b$ as a center.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a display comprising a first area, a second area, and a folding area between the first area and the second area;
    a first housing configured to support the first area;
    a second housing configured to support the second area; and
    a hinge assembly configured to connect the first housing to the second housing and operate between a folded state in which the first area and the second area face each other and an unfolded state in which the first area and the second area do not face each other,
    wherein the hinge assembly comprises:
        a hinge bracket;
        a slider slidably connected to the hinge bracket and comprising a pair of reference cams and a pair of rotation rails configured to define a pair of parallel hinge axes;
        a pair of rotators rotatably connected to the slider with the pair of hinge axes as centers, respectively, and each comprising a rotation cam configured to interoperate with a corresponding one of the reference cams; and
        elastic members, each comprising an elastic material, and each configured to provide an elastic force in a direction in which the reference cams and the corresponding rotation cams press each other,
    wherein, as the rotators rotate on the respective hinge axes, the slider slides relative to the hinge bracket in a direction of the hinge axes by interoperation between the reference cams and the rotation cams.

2. The electronic device of claim 1, wherein the slider further comprises:
    a pair of main bodies in which each of the rotation rails and each of the reference cams are provided; and
    a bridge body configured to connect the pair of main bodies to each other.

3. The electronic device of claim 2, wherein the slider comprises elastic member support pins protruding from each main body and each configured to support a first side of a corresponding elastic member.

4. The electronic device of claim 3, wherein the rotation rail and the reference cam are provided on a first side of the main body, and the elastic member support pin is provided on a second side of the main body.

5. The electronic device of claim 4, wherein the hinge bracket comprises elastic member support protrusions each protruding in a direction facing a corresponding one of elastic member support pins and configured to support a second side of a corresponding elastic member.

6. The electronic device of claim 1, wherein the hinge bracket comprises a pair of sliding rails provided in a direction parallel with the hinge axes, and
    the slider further comprises a pair of sliding protrusions slidably connected to the pair of sliding rails along the pair of sliding rails, respectively.

7. The electronic device of claim 6, wherein the hinge bracket further comprises a pair of sliding guide rails provided in a direction parallel with the hinge axis, and
    the slider further comprises a sliding guide protrusion configured to guide a sliding path of the slider.

8. The electronic device of claim 1, wherein a pair of sliders is provided, and
    the pair of sliders is arranged such that a rotation rail and a corresponding reference cam are arranged in a direction facing each other and spaced apart from each other.

9. The electronic device of claim 1, wherein one slider is provided, and
    the hinge bracket comprises a pair of bracket rotation rails provided in a direction facing the pair of rotation rails of the slider.

10. The electronic device of claim 1, wherein each rotation cam has an arc shape with the corresponding hinge axis as a center.

11. The electronic device of claim 1, wherein each reference cam comprises a first surface, a second surface, and a third surface,
    each rotation cam comprises a fourth surface, a fifth surface, and a sixth surface,
    in the unfolded state, the first surface contacts the fourth surface,
    in the folded state, the third surface contacts the sixth surface,
    in an intermediate state between the unfolded state and the folded state, the second surface contacts the fifth surface, and
    the second surface and the fifth surface are inclined with respect to the hinge axis.

12. The electronic device of claim 1, wherein each rotator comprises a rail groove configured to interoperate with a corresponding rotation rail.

13. The electronic device of claim 12, wherein, in an intermediate state between the unfolded state and the folded state, the rotation rail is fastened in the rail groove by at least 0.5 millimeters.

14. The electronic device of claim 12, wherein a difference between a width of the rotation rail and a width of the rail groove is less than or equal to 0.03 millimeters.

15. A hinge assembly for a foldable electronic device, the hinge assembly comprising:
    a hinge bracket;
    a slider slidably connected to the hinge bracket and comprising a pair of reference cams and a pair of rotation rails configured to define a pair of parallel hinge axes;
    a pair of rotators rotatably connected to the slider with the pair of hinge axes as centers, respectively, and each comprising a rotation cam configured to interoperate with a corresponding one of the reference cams; and elastic members, each comprising an elastic material, and each configured to provide an elastic force in a direction in which the reference cams and the corresponding rotation cams press each other, wherein, as the rotators rotate on the respective hinge axes, the slider slides relative to the hinge bracket in a direction of the hinge axes by interoperation between the reference cams and the rotation cams.

16. The hinge assembly of claim 15, wherein the slider further comprises:
   a pair of main bodies in which each of the rotation rails and each of the reference cams are provided;
   a bridge body connecting the pair of main bodies to each other; and
   elastic member support pins protruding from the main body and each configured to support a first side of a corresponding elastic member.

17. The hinge assembly of claim 15, wherein the hinge bracket comprises a pair of sliding rails provided in a direction parallel with the hinge axes, and
   the slider further comprises a pair of sliding protrusions slidably connected to the pair of sliding rails along the pair of sliding rails, respectively.

18. The hinge assembly of claim 15, wherein each rotation cam has an arc shape with the corresponding hinge axis as a center.

19. An electronic device comprising:
   a display comprising a first area, a second area, and a folding area between the first area and the second area;
   a first housing configured to support the first area;
   a second housing configured to support the second area; and
   a hinge assembly configured to connect the first housing to the second housing and operate between a folded state in which the first area and the second area face each other and an unfolded state in which the first area and the second area do not face each other, wherein the hinge assembly comprises:
   a hinge bracket;
   a slider slidably connected to the hinge bracket and comprising a pair of reference cams and a pair of rotation rails configured to define a pair of parallel hinge axes;
   a pair of rotators rotatably connected to the slider with the pair of hinge axes as centers, respectively, and each comprising a rotation cam configured to interoperate with a corresponding one of the reference cams; and
   elastic members, each comprising an elastic material, and each configured to provide an elastic force in a direction in which the reference cams and the corresponding rotation cams press each other, wherein the slider further comprises:
   a pair of main bodies in which each of the rotation rails and each of the reference cam are provided;
   a bridge body connecting the pair of main bodies to each other; and
   elastic member support pins protruding from the main body and each configured to support a first side of a corresponding elastic member, wherein the hinge bracket comprises a pair of sliding rails provided in a direction parallel with the hinge axes, the slider further comprises a pair of sliding protrusions slidably connected to the pair of sliding rails along the pair of sliding rails, respectively, wherein each rotation cam has an arc shape with the corresponding hinge axis as a center, and wherein, as the rotators rotate on the respective hinge axes, the slider slides relative to the hinge bracket in a direction of the hinge axes by interoperation between the reference cams and the rotation cams.

* * * * *